United States Patent
Maegawa et al.

(10) Patent No.: US 7,612,983 B2
(45) Date of Patent: Nov. 3, 2009

(54) MONOLITHIC CERAMIC ELECTRONIC COMPONENT AND METHOD FOR MANUFACTURING THE SAME

(75) Inventors: Kiyotaka Maegawa, Hikone (JP); Mitsuhiro Kusano, Omihachiman (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 302 days.

(21) Appl. No.: 11/845,965

(22) Filed: Aug. 28, 2007

(65) Prior Publication Data

US 2007/0297119 A1 Dec. 27, 2007

Related U.S. Application Data

(63) Continuation of application No. PCT/JP2006/307577, filed on Apr. 10, 2006.

(30) Foreign Application Priority Data

May 26, 2005 (JP) .............................. 2005-154533

(51) Int. Cl.
*H01G 4/228* (2006.01)
*H01G 4/06* (2006.01)
(52) U.S. Cl. ........................ 361/309; 361/311; 29/25.42
(58) Field of Classification Search .............. 361/306.3, 361/309–310; 29/25.42
See application file for complete search history.

(56) References Cited

U.S. PATENT DOCUMENTS

| | | | | |
|---|---|---|---|---|
| 4,652,967 A | * | 3/1987 | Sakabe et al. ............... | 361/309 |
| 4,701,827 A | * | 10/1987 | Fujikawa et al. ............ | 361/309 |
| 4,953,273 A | * | 9/1990 | Insetta et al. ............... | 29/25.42 |
| 5,093,774 A | * | 3/1992 | Cobb ........................ | 361/306.3 |
| 5,107,394 A | * | 4/1992 | Naito et al. ................. | 361/309 |
| 6,159,768 A | | 12/2000 | Ahn | |

FOREIGN PATENT DOCUMENTS

| | | |
|---|---|---|
| JP | 60-60708 A | 4/1985 |
| JP | 2000-200706 A | 7/2000 |
| JP | 2003-331649 A | 11/2003 |
| JP | 2005-079568 A | 3/2005 |

OTHER PUBLICATIONS

Official Communication for PCT Application No. PCT/JP2006/307577; mailed Jun. 27, 2006.

* cited by examiner

*Primary Examiner*—Eric Thomas
(74) *Attorney, Agent, or Firm*—Keating & Bennett, LLP

(57) ABSTRACT

A monolithic ceramic electronic component includes a ceramic laminate provided with ceramic layers and internal electrode layers disposed between the ceramic layers such that a portion of each internal electrode is led to an end surface of the ceramic laminate and the external electrode disposed on the end surface of the ceramic laminate to which the internal electrode layers are led, so as to connect to the internal electrode layers. At least one end portion in a longitudinal direction of an exposed portion of the internal electrode layer led to and exposed at the end surface of the ceramic laminate is covered with a glass film, and the internal electrodes and the external electrode are electrically connected to each other at a portion not covered with the glass film in the exposed portion of the internal electrode layer.

14 Claims, 16 Drawing Sheets

MONOLITHIC CERAMIC ELECTRONIC COMPONENT AND METHOD FOR MANUFACTURING THE SAME

BACKGROUND OF THE INVENTION

1. Field of the Invention

The present invention relates to a monolithic ceramic electronic component and a method for manufacturing the same. In particular, the present invention relates to a monolithic ceramic electronic component having a structure in which internal electrodes are disposed between ceramic layers such that a portion of each internal electrode is led to an end surface and an external electrode is disposed on an end surface of a ceramic laminate so as to connect to the internal electrode layers, as well as a method for manufacturing the monolithic ceramic electronic component.

2. Description of the Related Art

In general, a surface mount monolithic ceramic capacitor that is a typical monolithic ceramic electronic component has a structure in which, as shown in FIG. 15, a plurality of internal electrode layers 52 (52a, 52b) are disposed opposite to each other with ceramic layers 53 therebetween while being alternately led to opposite end surfaces 54 (54a, 54b) so as to constitute a ceramic laminate 51, and a pair of external electrodes 55 (55a, 55b) are disposed on the two end portions of the ceramic laminate 51 so as to connect to the internal electrode layers 52 (52a, 52b).

In the case where the monolithic ceramic electronic component provided with the external electrodes (in this example, the monolithic ceramic capacitor) is produced, in general, the external electrodes are formed by the procedure as described below and in Japanese Unexamined Patent Application Publication No. 2003-331649.

(1) As shown in FIG. 16A, an electrically conductive paste 62 having a predetermined thickness is applied to a planar table 61.

(2) As shown in FIG. 16B, an end surface 54 of the ceramic laminate 51 is immersed into the electrically conductive paste 62.

(3) As shown in FIG. 16C, the ceramic laminate 51 is pulled up from the electrically conductive paste 62. In this manner, a thick film (electrically conductive paste film) 63 serving as the external electrode 55 (FIG. 15) is formed on the end surface 54 of the ceramic laminate 51.

(4) The ceramic laminate 51 provided with the thick film (electrically conductive paste film) 63 is fired so as to form the external electrode 55.

In general, the thus formed external electrode is subjected to a plating treatment in order to improve the solder leaching resistance, solderability, and the like, so that a Ni plating film, a Sn plating film, or the like is formed on the surface of the external electrode.

It is desirable that the external electrode formed as described above has a uniform thickness on the whole from the viewpoint of the weather resistance, the reliability in the connection to the internal electrode layers, the shape and dimension stability of a product, and the like. However, in the stage of the item (3) in which the ceramic laminate 51 is pulled up from the electrically conductive paste 62, the electrically conductive paste 62 adhered to the end surface 54 of the ceramic laminate 51 is drawn toward a center region X of the end surface 54 of the ceramic laminate 51 in relation to the self weight, the stress generated during the pulling up, and the like. Consequently, as shown in FIG. 16C, the thickness of the external electrode 55 in the perimeter region Y of the end surface 54 is decreased as compared with the thickness of the center region X.

As a result, when the external electrode is subjected to Ni plating or Sn plating, a plating solution is liable to intrude into the ceramic laminate and, thereby, deterioration of the insulation resistance and deterioration of the weather resistance occur easily.

In general, metal components, e.g., Ni and Cu, constituting the internal electrode layer has a sintering temperature lower than that of the surrounding ceramic layer, and the internal electrode layer begins to shrink earlier during the firing. Therefore, as schematically shown in FIG. 17B, pores 65 are easily generated at end portions of the internal electrode layers 52. In the case where such a pore 65 is generated, the influence of intrusion of the plating solution is further increased.

In order to solve the problems resulting from the intrusion of the plating solution, a method has been proposed, in which glass is added to the electrically conductive paste for forming an external electrode, a ceramic laminate is sealed by a glass film formed in the vicinity of the interface to the ceramic laminate during firing and, thereby, intrusion of the plating solution is suppressed and prevented.

However, in order to completely prevent the intrusion of the plating solution, it is necessary to add large amounts of glass to the paste or set the baking temperature of the electrically conductive paste at a high level. If the amount of addition of the glass to the electrically conductive paste for forming the external electrode is increased, there are problems in that, for example, poor plating occurs as a result of rising (excessive deposition) of glass to the external electrode surface.

SUMMARY OF THE INVENTION

In order to overcome the problems described above, preferred embodiments of the present invention provide a monolithic ceramic electronic component, wherein intrusion of the plating solution into a ceramic laminate can be suppressed and prevented so as not to cause deterioration of the insulation resistance and the deterioration of the weather resistance, and satisfactory reliability of electrical connection between an external electrode and internal electrodes and satisfactory solderability of the external electrode are achieved, as well as a method for manufacturing the monolithic ceramic electronic component.

In order to solve the above-described problems, a monolithic ceramic electronic component according to a preferred embodiment of the present invention includes a ceramic laminate provided with a plurality of ceramic layers, and an internal electrode layer disposed between the ceramic layers such that a portion of the internal electrode layer is led to an end surface, and an external electrode disposed on the end surface, to which the internal electrode layer is led, so as to connect to the internal electrode layer, wherein at least one end portion in a longitudinal direction of an exposed portion, at which the internal electrode layer is led and exposed, in the end surface of the ceramic laminate is covered with a glass film, and the internal electrode layer and the external electrode are electrically connected to each other at a portion not covered with the glass film in the exposed portion of the internal electrode layer.

A monolithic ceramic electronic component according to another preferred embodiment of the present invention includes a ceramic laminate provided with a plurality of ceramic layers, and a plurality of internal electrode layers disposed between the plurality of ceramic layers such that a portion of each internal electrode layer is led to an end surface, and an external electrode disposed on the end surface, to which the plurality of internal electrode layers are led, so as to connect to the plurality of internal electrode layers, wherein at least one end portion in a longitudinal direction of at least one of the uppermost internal electrode layer and the lowermost internal electrode layer among the plurality of internal electrode layers led to and exposed at the end surface of the ceramic laminate is covered with a glass film, and the plurality of internal electrode layers and the external electrode are electrically connected to each other at portions not covered with the glass film among the exposed portions of the plurality of internal electrode layers.

Both end portions in the longitudinal direction of both the uppermost internal electrode layer and the lowermost internal electrode layer are preferably covered with the glass film.

Alternatively, at least both end portions in a longitudinal direction of all the plurality of internal electrode layers exposed at the end surface of the ceramic laminate are preferably covered with the glass film.

On the end surface of the ceramic laminate, at which the internal electrodes are exposed, the glass film covering both end portions in the longitudinal direction of the exposed portion of the internal electrode layer extends from one ridge that is perpendicular or substantially perpendicular to the lamination direction among ridges included in the end surface so as to reach the other ridge opposite to the one ridge and is also disposed to extend from the ridge that is parallel or substantially parallel to the lamination direction to the position suitable for covering both end portions in the longitudinal direction of the exposed portion of the internal electrode layer, and in addition, the internal electrode layers and the external electrode are electrically connected to each other at portions not covered with the glass film in the center portions in the longitudinal direction of the internal electrode layers.

In the exposed portion of the internal electrode layer on the end portion of the ceramic laminate, the length in a direction along the longitudinal direction of the internal electrode layer of a portion not covered with the glass film covering both end portions in the longitudinal direction is preferably about 0.1 mm or more.

On the end surface of the ceramic laminate, at which the internal electrode layers are exposed, at least one region of two regions, at which the internal electrode layer is not exposed, from one ridge and the other ridge that is perpendicular or substantially perpendicular to the lamination direction to the region, at which the internal electrode layers are exposed, is covered with the glass film.

A method for manufacturing a monolithic ceramic electronic component according to another preferred embodiment of the present invention is a method for manufacturing a monolithic ceramic electronic component including a ceramic laminate, in which internal electrode layers are disposed between ceramic layers such that a portion of each internal electrode is led to an end surface, and an external electrode disposed on the end surface, to which the internal electrode layers are led, so as to connect to the internal electrode layers and having a structure in which at least one end portion in a longitudinal direction of an exposed portion of the internal electrode layer exposed at the end surface of the ceramic laminate is covered with a glass film, including the steps of:
(a) forming the ceramic laminate including the internal electrode layers disposed between the ceramic layers such that a portion of each internal electrode is led to an end surface of the ceramic laminate;
(b) applying a glass paste to a support;
(c) immersing the end surface of the ceramic laminate, at which the internal electrode layers are led and exposed, into the glass paste on the support such that the glass paste is adhered to at least one end portion in a longitudinal direction of the exposed portion of the internal electrode layer;
(d) applying an electrically conductive paste for forming an external electrode to the end surface, in which the glass paste is adhered to at least one end portion in the longitudinal direction of the exposed portion of the internal electrode layer, of the ceramic laminate; and
(e) heat-treating the ceramic laminate to bake the glass paste and the electrically conductive paste so as to fire the glass film and the external electrode.

In step (b), the glass paste is preferably applied at a predetermined interval to the support, and in the step (c), the end surface of the ceramic laminate, at which the internal electrode layers are led and exposed, is preferably immersed into the glass paste on the support such that the glass paste is adhered to both end portions in the longitudinal direction of the exposed portion of the internal electrode layer.

A method for manufacturing a monolithic ceramic electronic component according to another preferred embodiment of the present invention is a method for manufacturing a monolithic ceramic electronic component including a ceramic laminate, in which internal electrode layers are disposed between ceramic layers such that a portion of each internal electrode is led to an end surface of the ceramic laminate, and an external electrode disposed on the end surface, to which the internal electrode layers are led, so as to connect to the internal electrode layers and having a structure in which at least one end portion in a longitudinal direction of an exposed portion of the internal electrode layer exposed at the end surface of the ceramic laminate is covered with a glass film, including the steps of:
(a) forming the ceramic laminate including the internal electrode layers disposed between the ceramic layers such that a portion of each internal electrode is led to an end surface of the ceramic laminate;
(b) applying a glass paste to a support;
(c) immersing one end portion of the end surface of the ceramic laminate, at which the internal electrode layers are exposed, into the glass paste, in a position in which the ceramic laminate is inclined and a ridge that is parallel or substantially parallel to the lamination direction, among ridges included in the end surface, is nearly parallel to the surface of the glass paste applied to the support, so as to adhere the glass paste to at least the one end portion in the longitudinal direction of the exposed portion of the internal electrode layer in a glass paste application step;
(d) applying an electrically conductive paste for forming an external electrode to the end surface, in which the glass paste is adhered to at least the one end portion in the longitudinal direction of the exposed portion of the internal electrode layer, of the ceramic laminate; and
(e) heat-treating the ceramic laminate to bake the glass paste and the electrically conductive paste so as to fire the glass film and the external electrode.

In step (c) of applying the glass paste, after the glass paste is adhered to at least the one end portion in the longitudinal direction of the exposed portion of the internal electrode layer, the ceramic laminate is further inclined, the end portion of the end surface, at which the internal electrode layers are exposed, is preferably immersed into the glass paste, in a position in which a ridge that is perpendicular or substantially perpendicular to the lamination direction, among the ridges included in the end surface, is nearly parallel to the surface of the glass paste applied to the support, so as to adhere the glass paste to at least one region of two regions, at which the internal electrode layer is not exposed, from one ridge and the other ridge that is perpendicular or substantially perpendicular to the lamination direction to the region, at which the internal electrode layers are exposed, on the end surface of the ceramic laminate, at which the internal electrode is exposed.

The monolithic ceramic electronic component according to a preferred embodiment of the present invention has a structure in which the external electrode is disposed on the end surface of the ceramic laminate including the internal electrode layer disposed between the ceramic layers, so as to connect to the exposed internal electrode layer. In the monolithic ceramic electronic component, at least one end portion in a longitudinal direction of the exposed portion, at which the internal electrode layer is led and exposed, in the end surface of the ceramic laminate is covered with a glass film, and the internal electrode layer and the external electrode are electrically connected to each other at a portion not covered with the glass film in the exposed portion of the internal electrode layer. Consequently, even in the case where an external electrode having a thickness smaller than the thickness of the center region is formed in a perimeter region of the end surface of the ceramic laminate, in a plating step, intrusion of the plating solution into a ceramic laminate through an end portion of the internal electrode layer in the end surface of the ceramic laminate can be suppressed and prevented, so that a monolithic ceramic electronic component exhibiting high reliability without the occurrence of deterioration of the insulation resistance nor deterioration of the weather resistance can be produced.

Furthermore, since it is not necessary to excessively increase the content of a glass component in the external electrode, a monolithic ceramic electronic component exhibiting satisfactory solderability can be produced.

The monolithic ceramic electronic component according to another preferred embodiment of the present invention has a structure in which the external electrode is disposed on the end surface of the ceramic laminate including the plurality of ceramic layers and the plurality of internal electrode layers disposed between the plurality of ceramic layers, so as to connect to the exposed plurality of internal electrode layers. In the monolithic ceramic electronic component, at least one end portion in the longitudinal direction of at least one of the uppermost internal electrode layer and the lowermost internal electrode layer among the plurality of internal electrode layers led to and exposed at the end surface of the ceramic laminate is covered with a glass film, and the plurality of internal electrode layers and the external electrode are electrically connected to each other at portions not covered with the glass film among the exposed portions of the plurality of internal electrode layers. Consequently, the regions corresponding to regions in which the thickness of the external electrode is liable to become at a minimum can be sealed with the glass film. That is, even in the case where many internal electrodes are disposed, intrusion of the plating solution into a ceramic laminate during the plating step can be suppressed by covering merely at least one end portion in the longitudinal direction of at least one of the uppermost internal electrode layer and the lowermost internal electrode layer with a glass film, so that a monolithic ceramic electronic component exhibiting high reliability can be produced.

In the monolithic ceramic electronic component according to another preferred embodiment of the present invention, both end portions in the longitudinal direction of both the uppermost internal electrode layer and the lowermost internal electrode layer are covered with the glass film. Thus, a highly reliable monolithic ceramic electronic component capable of suppressing intrusion of the plating solution into the ceramic laminate during the plating step can be produced reliably.

In the monolithic ceramic electronic component according to another preferred embodiment of the present invention, at least both end portions in the longitudinal direction of all the plurality of internal electrode layers exposed at the end surface of the ceramic laminate are covered with the glass film. Thus, intrusion of the plating solution into the ceramic laminate can be suppressed and prevented further reliably.

In the monolithic ceramic electronic component according to another preferred embodiment of the present invention, the glass film covering both end portions in the longitudinal direction of the exposed portion of the internal electrode layer is disposed to extend from one ridge that is perpendicular or substantially perpendicular to the lamination direction among the ridges included in the end surface of the ceramic laminate so as to reach the other ridge opposite to the one ridge and is also disposed to extend from the ridge that is parallel or substantially parallel to the lamination direction to the position suitable for covering both end portions in the longitudinal direction of the exposed portion of the internal electrode layer, and in addition, the internal electrode layers and the external electrode are electrically connected to each other at portions not covered with the glass film in the center portions in the longitudinal direction of the internal electrode layers, the regions, into which the plating solution is liable to intrude, of the ceramic laminate can be sealed with the glass film further reliably.

In the monolithic ceramic electronic component according to another preferred embodiment of the present invention, the length in a direction along the longitudinal direction of the internal electrode layer of a portion not covered with the glass film covering both end portions in the longitudinal direction is about 0.1 mm or more in the exposed portion of the internal electrode layer on the end portion of the ceramic laminate. Thus, the electrical continuity between the internal electrode layers and the external electrode can be ensured and a highly reliable monolithic ceramic electronic component can be produced.

In the monolithic ceramic electronic component according to another preferred embodiment of the present invention, on the end surface of the ceramic laminate, at which the internal electrode layers are exposed, at least one region of two regions, at which the internal electrode layer is not exposed, from one ridge and the other ridge that is perpendicular or substantially perpendicular to the lamination direction to the region, at which the internal electrode layers are exposed, is covered with the glass film, regions which are other than both end portions of the exposed portion of the internal electrode layers on the end surface of the ceramic laminate and which are intruded easily by the plating solution (the regions corresponding to regions in which the thickness of the external electrode is small) can be sealed with the glass film further reliably.

A method for manufacturing a monolithic ceramic electronic component according to a preferred embodiment of the present invention includes the steps of (a) forming the ceramic laminate including the internal electrode layers disposed between the ceramic layers such that a portion of each internal electrode is led to the end surface of the ceramic laminate, (b) applying the glass paste to the support, (c) immersing the end surface of the ceramic laminate, at which the internal electrode layers are led and exposed, into the glass paste on the support such that the glass paste is adhered to at least one end portion in a longitudinal direction of the exposed portion of the internal electrode layer, (d) applying the electrically conductive paste for forming the external electrode to the end surface of the ceramic laminate, in which the glass paste is adhered to at least one end portion in the longitudinal direction of the exposed portion of the internal electrode layer, and (e) heat-treating the ceramic laminate to bake the glass paste and the electrically conductive paste so as to fire the glass film and the external electrode. Consequently, a highly reliable monolithic ceramic electronic component including the ceramic laminate, in which the internal electrode layers are disposed between ceramic layers such that a part of each internal electrode is led to an end surface, and the external electrode disposed on the end surface, to which the internal electrode layers are led, so as to connect to the internal electrode layers, having a structure in which at least one end portion in a longitudinal direction of the exposed portion of the internal electrode layer exposed at the end surface of the ceramic laminate is covered with a glass film, and exhibiting no deterioration of the insulation resistance nor deterioration of the weather resistance can be produced efficiently and reliably.

In a case where the glass paste is applied at a predetermined interval to the support in the step (b) of the preferred embodiment of the present invention, and in the step (c), the end surface of the ceramic laminate, at which the internal electrode layers are led and exposed, is immersed into the glass paste on the support such that the glass paste is adhered to both end portions in the longitudinal direction of the exposed portion of the internal electrode layer, a highly reliable monolithic ceramic electronic component having a structure in which both end portions in the longitudinal direction of the exposed portion of the internal electrode layer are covered with the glass film and exhibiting no deterioration of the insulation resistance nor deterioration of the weather resistance can be produced reliably and efficiently.

The method for manufacturing a monolithic ceramic electronic component according to another preferred embodiment of the present invention includes the steps of (a) forming the ceramic laminate including the internal electrode layers disposed between the ceramic layers such that a portion of each internal electrode is led to the end surface of the ceramic laminate, (b) applying the glass paste to the support, (c) immersing one end portion of the end surface of the ceramic laminate, at which the internal electrode layers are exposed, into the glass paste, in a position in which the ceramic laminate is inclined and the ridge that is parallel or substantially parallel to the lamination direction, among the ridges included in the end surface, is nearly parallel to the surface of the glass paste applied to the support, so as to adhere the glass paste to at least the one end portion in the longitudinal direction of the exposed portion of the internal electrode layer in the glass paste application step, (d) applying the electrically conductive paste for forming the external electrode to the end surface of the ceramic laminate, in which the glass paste is adhered to at least the one end portion in the longitudinal direction of the exposed portion of the internal electrode layer, and (e) heat-treating the ceramic laminate to bake the glass paste and the electrically conductive paste so as to fire the glass film and the external electrode. Consequently, a highly reliable monolithic ceramic electronic component including a ceramic laminate, in which internal electrode layers are disposed between the ceramic layers such that a portion of each internal electrode is led to an end surface of the ceramic laminate, and the external electrode disposed on the end surface of the ceramic laminate, to which the internal electrode layers are led, so as to connect to the internal electrode layers, having a structure in which at least one end portion in the longitudinal direction of the exposed portion of the internal electrode layer exposed at the end surface of the ceramic laminate is covered with a glass film, and exhibiting no deterioration of the insulation resistance nor deterioration of the weather resistance can be produced efficiently.

After the glass paste is adhered to at least the one end portion in the longitudinal direction of the exposed portion of the internal electrode layer in the step (c) of applying the glass paste, the ceramic laminate is preferably further inclined, and the end portion of the end surface of the ceramic laminate, at which the internal electrode layers are exposed, is immersed into the glass paste, in a position in which a ridge that is perpendicular or substantially perpendicular to the lamination direction among the ridges included in the end surface is nearly parallel to the surface of the glass paste applied to the support, so as to adhere the glass paste to at least one region of two regions, at which the internal electrode layer is not exposed, from one ridge and the other ridge that is perpendicular or substantially perpendicular to the lamination direction to the region, at which the internal electrode layers are exposed, on the end surface of the ceramic laminate, at which the internal electrodes are exposed, regions which are other than both end portions of the exposed portion of the internal electrode layers on the end surface of the ceramic laminate and which are intruded easily by the plating solution (the regions corresponding to regions in which the thickness of the external electrode is small) can be sealed with the glass film further reliably.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

The features of the present invention will be described below in more detail with reference to examples according to preferred embodiments of the present invention.

EXAMPLE 1

A monolithic ceramic capacitor (Sample Nos. 1 to 11), as described below, was produced as a monolithic ceramic electronic component, and characteristics thereof were examined.

Figure 1:
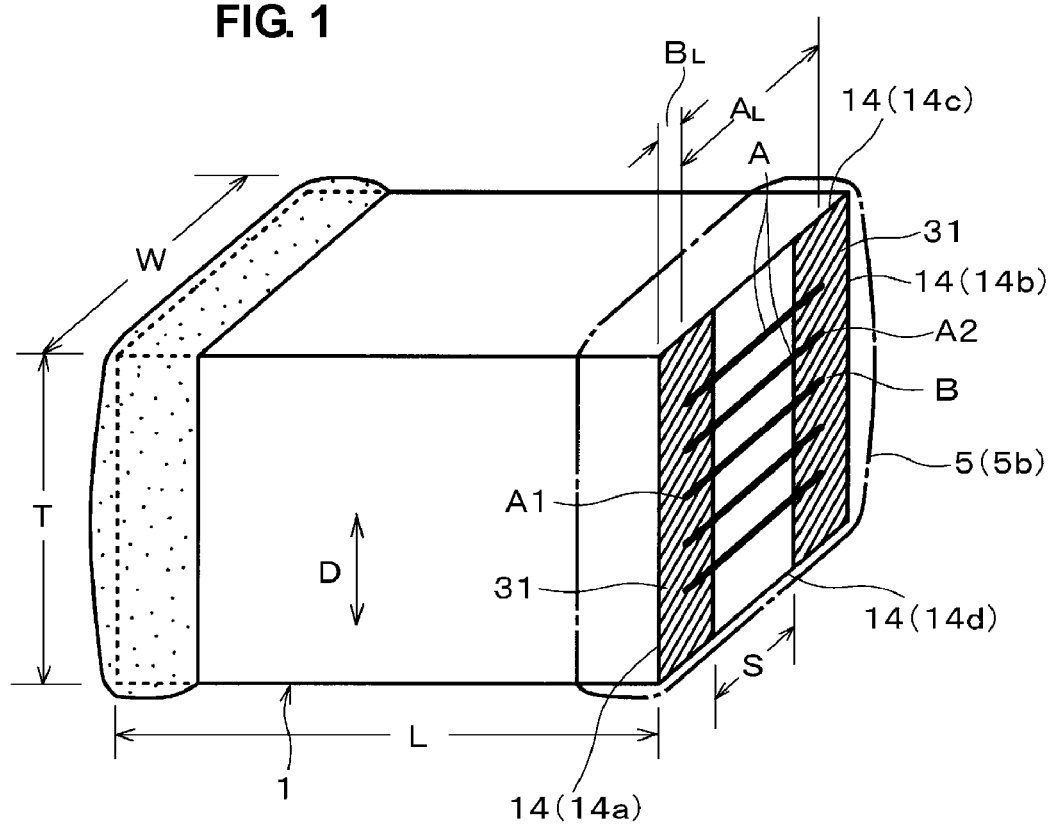
FIG. 1 is a perspective view showing the configuration of a monolithic ceramic electronic component (monolithic ceramic capacitor) according to a preferred embodiment of the present invention.
Figure 2:
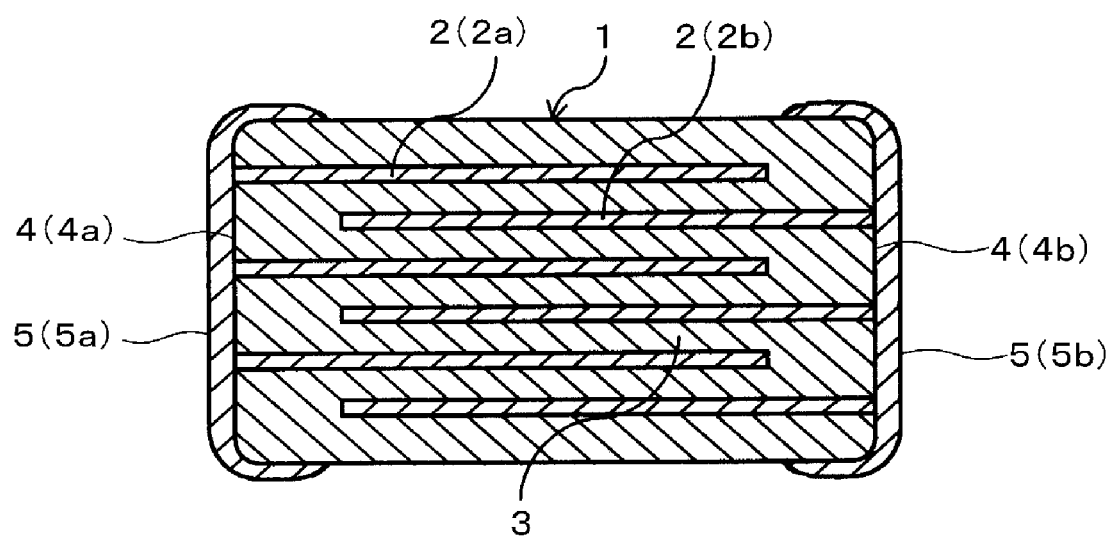
FIG. 2 is a sectional elevation view showing the configuration of a monolithic ceramic electronic component according to a preferred embodiment of the present invention.

The monolithic ceramic capacitor produced in Example 1 is a monolithic ceramic capacitor having a structure in which, as shown in FIG. 1 and FIG. 2, a plurality of internal electrode layers 2 (2a, 2b) are disposed opposite to each other with ceramic layers 3 therebetween while being alternately led to opposite end surfaces 4 (4a, 4b) so as to constitute a ceramic laminate 1, and a pair of external electrodes 5 (5a, 5b) are disposed on the two end portions of the ceramic laminate 1 so as to connect to the internal electrode layers 2 (2a, 2b), as a basic structure.

A production method and a structure of each sample (monolithic ceramic capacitor) and an evaluation of characteristics will be described below.

Production of Sample Nos. 1 to 4

1) Production of Ceramic Laminate

Ceramic green sheets primarily containing $BaTiO_3$ were prepared. An electrically conductive film (electrically conductive paste) serving as an internal electrode layer after firing was printed on each of surfaces of the predetermined number of ceramic green sheets such that one edge is exposed at any one of end surface sides of the ceramic green sheet. The predetermined number of the resulting plurality of ceramic green sheets were laminated and press-bonded while an objective value of capacitance was set at about 10 µF, so that an unfired ceramic laminate was formed. The resulting ceramic laminate was sequentially subjected to degreasing, firing, and a surface treatment, so that a ceramic laminate having the approximate dimensions of 2 mm length (L)×1.2 mm width (W)×1.2 mm height (T) was produced.

In the present example, the printing position of the electrically conductive film (electrically conductive paste) for the internal electrode layer was adjusted such that in the ceramic laminate 1, the dimension (length) AL in a longitudinal direction of the exposed portion A (refer to FIG. 1) of the internal electrode layer 2 exposed at the end surface 4 of the ceramic laminate 1 became about 1.0 mm and the dimension BL of a portion (blank) B (refer to FIG. 1), at which the internal electrode layer was not exposed, on both sides of the exposed portion A became about 0.1 mm.

(2) Production of Glass Paste and Electrically Conductive Paste

A borosilicate glass frit and an organic vehicle, in which about 25 percent by weight of acrylic resin was added relative to terpineol, were blended with at a ratio of about 30 to 70, and mixing and dispersion were conducted with a triple-roll mill so as to produce a glass paste.

A Cu powder (electrically conductive powder) having an average particle diameter of about 2 µm, a borosilicate glass frit, and an organic vehicle, in which about 25 percent by weight of acrylic resin was added relative to terpineol, were blended at a ratio of about 20 to 5 to 75, and mixing and dispersion were conducted with a triple-roll mill so as to produce an electrically conductive paste.

The glass paste used in Example 1 was a mixture of the glass frit and the organic vehicle, as described above. The organic vehicle component disappears during the firing of the external electrode in the downstream operation, and merely the glass component remains. It is preferable that such a glass paste, in which merely the glass component remains after firing (a residual component of the glass paste is composed of 100% of glass), is used because the end portion of the internal electrode layer can be covered reliably. However, other components may be included insofar as the end portion of the internal electrode layer can be covered substantially.

Specifically, when the volume ratio of the glass component in the residual component, which remains after the firing, contained in the glass paste is about 40% or more, and preferably about 60% or more, the glass component covers the end portion of the internal electrode layer substantially, even when an electrically conductive component and the like other than the organic vehicle are contained in the remainder component. Therefore, the effects of preferred embodiments of the present invention is not impaired.

(3) Production of Glass Film

Figure 3A:
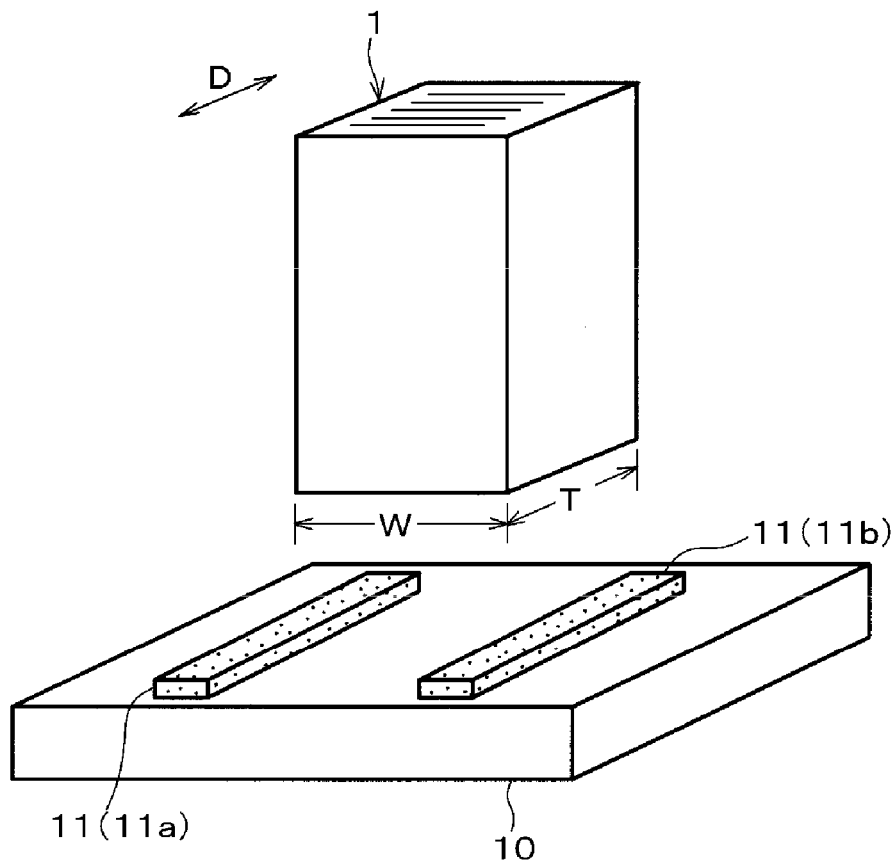
FIG. 3A is a perspective view and FIG. 3B is an elevation view showing a method for manufacturing the monolithic ceramic electronic component as shown in FIG. 1 and FIG. 2.
Figure 3B:
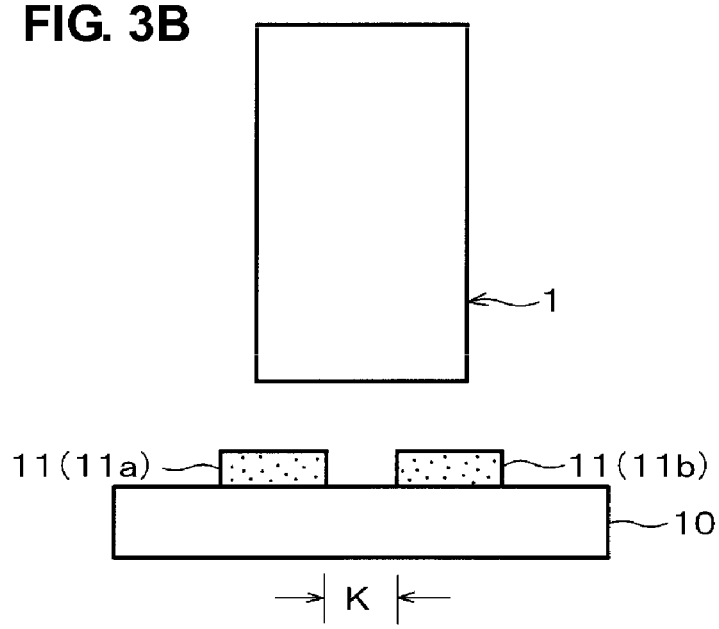

As shown in FIGS. 3A and 3B, two glass paste patterns 11a and 11b were formed on a support (table) 10 at a predetermined interval K by applying a glass paste 11 into the shape of bands. The support is not limited to the table 10, to which the glass paste 11 is applied directly, and a bedplate (table or the like) provided with a film on the surface may also be used, and the specific configuration thereof is not particularly limited.

Figure 4A:
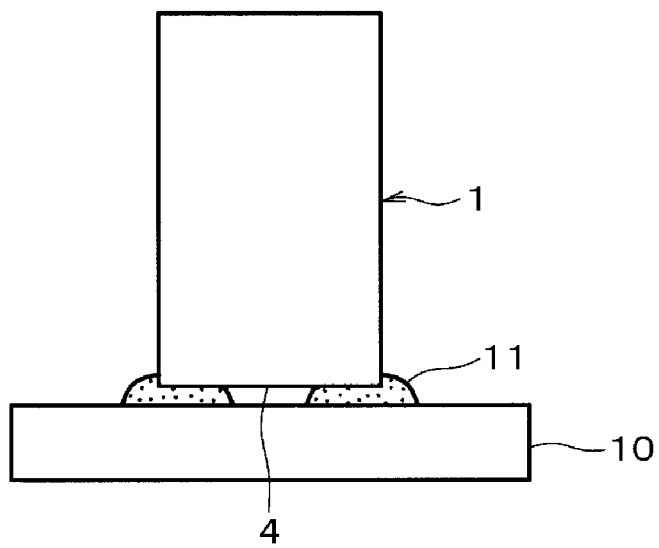
FIG. 4A and FIG. 4B are diagrams showing a method for manufacturing the monolithic ceramic electronic component as shown in FIG. 1 and FIG. 2.
Figure 4B:
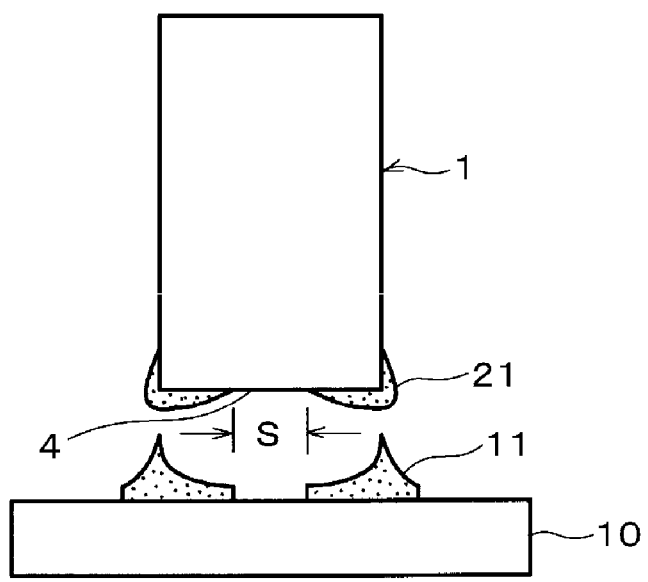

Subsequently, as shown in FIG. 4A, the end surface 4 of the ceramic laminate 1 was immersed into the glass paste 11 applied to the table 10 and, thereafter, as shown in FIG. 4B, the ceramic laminate 1 was pulled up, followed by drying, so that four types of samples (Samples 1 to 4), in which both ends of the internal electrode layers 2 exposed at the end surface 4 were covered with a glass paste film 21, were produced.

Here, the interval K (FIG. 3A) of the glass paste 11 applied to the table 10 was adjusted in such a way that the lengths S (FIG. 1 and FIG. 4B) of regions, which was not covered with the glass paste film 21, in the end surfaces, at which the internal electrode layers were exposed, (that is, the lengths of portions not covered with the glass paste film 21 of the exposed portions A of the internal electrode layers 2) of the four samples became approximately 0.1 mm (Sample 1), 0.2 mm (Sample 2), 0.4 mm (Sample 3), and 0.8 mm (Sample 4) on a value after firing basis.

This length S of the regions, which are not covered with the glass paste film 21, in the end surface, at which the internal electrode layers are exposed, can also be set by, for example, adjusting the pulling-up rate of the ceramic laminate 1, besides the method in which the interval K of the glass paste 11 applied to the table 10 is adjusted. An increase in the pulling-up rate of the ceramic laminate 1 can suppress wetting and spreading of the glass paste 11 toward the center portion of the end surface 4 of the ceramic laminate 1, so that the length S of regions, which is not covered with the glass paste film 21, in the end surface 4 of the ceramic laminate 11 can be increased.

The length S of the regions, which are not covered with the glass paste film 21, in the end surface 4 of the ceramic laminate 11 can also be set by adjusting the viscosity of the glass paste 11. A decrease in the viscosity of the glass paste 11 facilitates the wetting and spreading of the glass paste 11 toward the center portion of the end surface 4 of the ceramic laminate 1, so that the length S of the regions, which are not covered with the glass paste film 21, in the end surface 4 of the ceramic laminate 11 can be decreased.

(4) Formation of External Electrode

The electrically conductive paste was applied to the end surface 4 of the ceramic laminate 1, in which both ends of the internal electrodes 2 exposed at the end surface 4 were covered with the glass paste film 21 and, thereafter, drying was conducted at about 150° C. for approximately 15 minutes.

Subsequently, firing was conducted in a neutral atmosphere under the condition of keeping at about 850° C. for approximately 10 minutes.

Figure 5A:
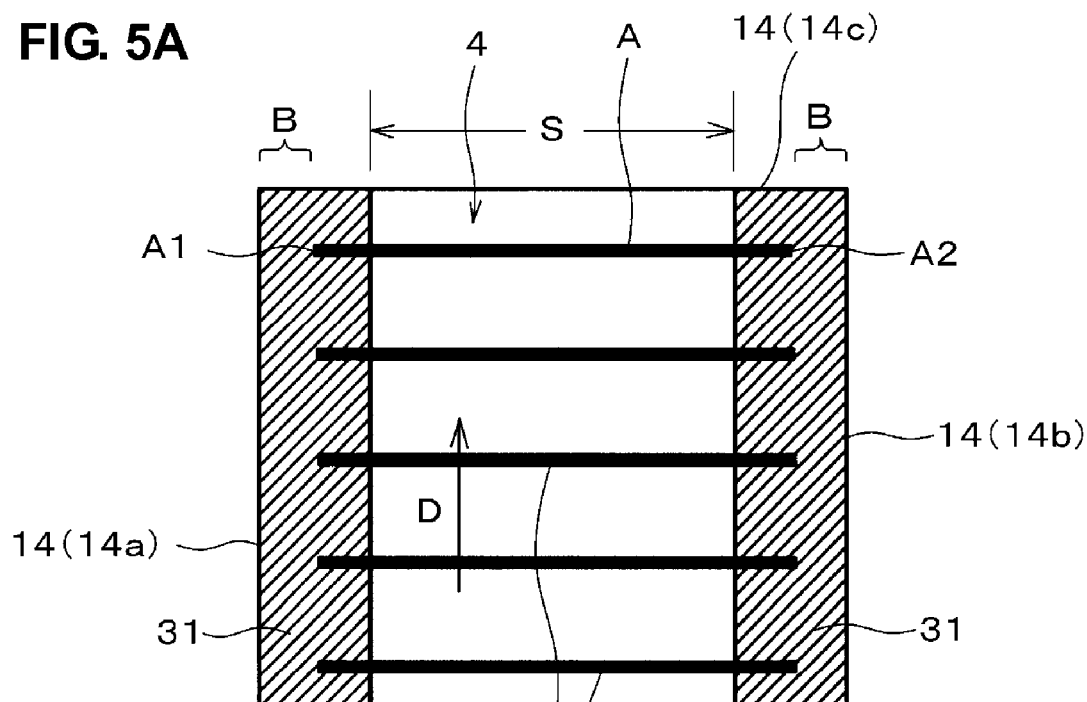
FIG. 5A and FIG. 5B are diagrams, each showing an end surface of a ceramic laminate of a monolithic ceramic electronic component produced in Example 1 of preferred embodiments of the present invention.
Figure 5B:
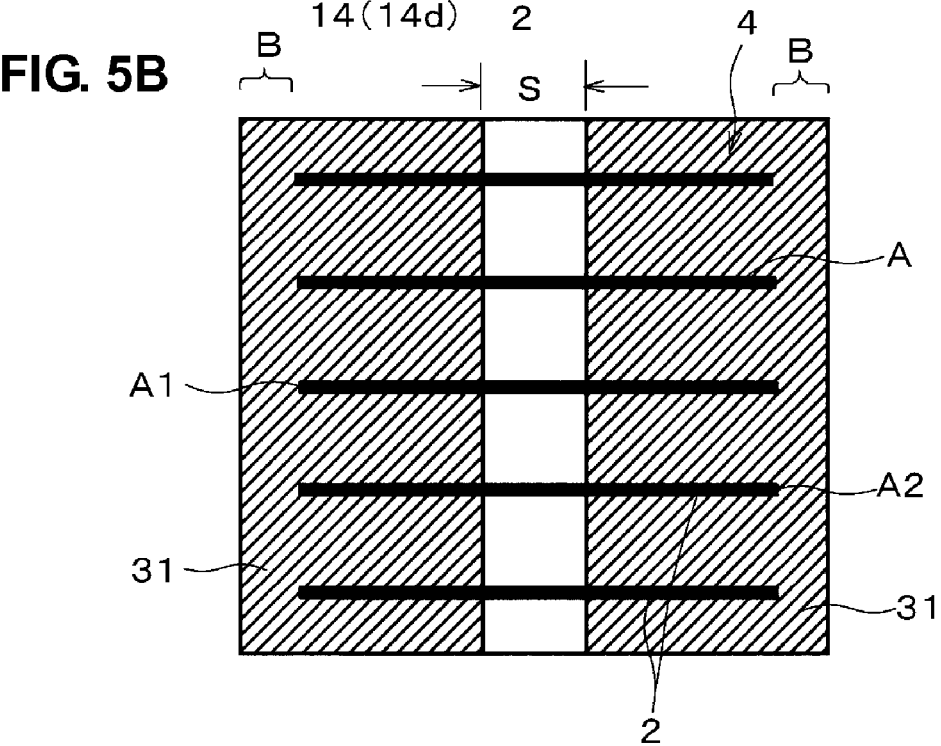

In this manner, as shown in FIG. 1 and FIGS. 5A and 5B, the glass film 31 covering the both end-side portions of the end surface of the ceramic laminate 1 (regions including both end portions A1 and A2 of the exposed portions A of the internal electrode layers 2) were formed and, in addition, the external electrode 5 (5a, 5b) covering the entire end surface 4 including the glass film 31 were formed. The length in the length direction of the exposed portion A of the internal electrode layer 2 in the glass film 31 formation region may be decreased as shown in FIG. 5A, or be increased as shown in FIG. 5B.

(5) Formation of Plating Film

A Ni plating film was formed by electrolytic plating on the external electrode 5 (5a, 5b) formed as described above. Furthermore, a Sn plating film was formed by electrolytic plating on the Ni plating film, so that monolithic ceramic capacitors of Sample Nos. 1 to 4 were produced.

In conduction of the Ni plating and the Sn plating, citric acid was used as a complexing agent in a plating bath. The electrolytic plating was conducted while the plating condition was adjusted in such a way that the Ni plating film thickness became about 3 μm and the Sn plating film thickness became about 3 μm.

In this manner, the monolithic ceramic capacitors of Sample Nos. 1 to 4 were produced. In the structures of these monolithic ceramic capacitors of Sample Nos. 1 to 4, the glass films 31 were formed to extend from one ridge 14 (14c) that is perpendicular or substantially perpendicular to the lamination direction (the direction indicated by an arrow D as shown in FIG. 3A) so as to reach the other ridge 14 (14d) opposite to the one ridge 14 (14c) on the end surface 4, at which the internal electrode layers 2 were exposed, of the ceramic laminate 1 and were also formed from the ridges 14 (14a, 14b) parallel or substantially parallel to the lamination direction to the positions suitable for covering both end portions A1 and A2 in the longitudinal direction of the exposed portions A of the internal electrode layers, and in addition, the internal electrode layers 2 and the external electrode 5 were electrically connected to each other at portions not covered with the glass film in the center portions in the longitudinal direction of the exposed portions A of the internal electrode layers 2.

Production of Sample Nos. 5 to 8

(1) Production of Ceramic Laminate

The same ceramic laminate (a monolithic ceramic element serving as the monolithic ceramic capacitor) as that in the Sample Nos. 1 to 4 was prepared.

(2) Production of Glass Paste and Electrically Conductive Paste

The same glass paste and electrically conductive paste as those used in the Sample Nos. 1 to 4 were produced.

(3) Production of Glass Film

Figure 6A:
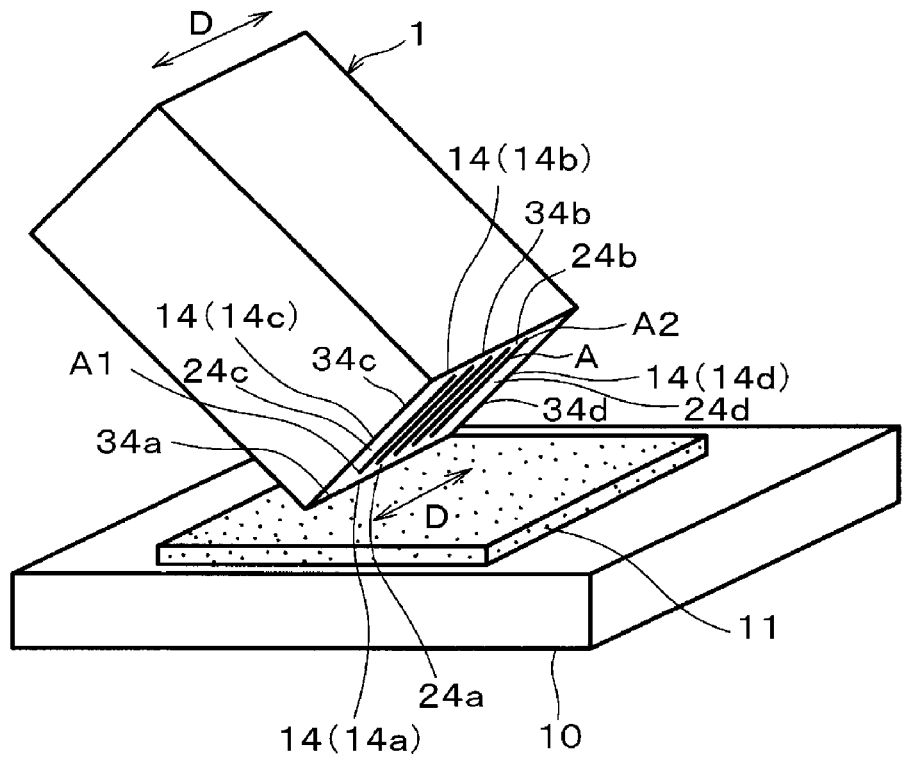
FIG. 6A is a perspective view and FIG. 6B is an elevation view showing another example of the method for manufacturing the monolithic ceramic electronic component according to a preferred embodiment of the present invention.
Figure 6B:
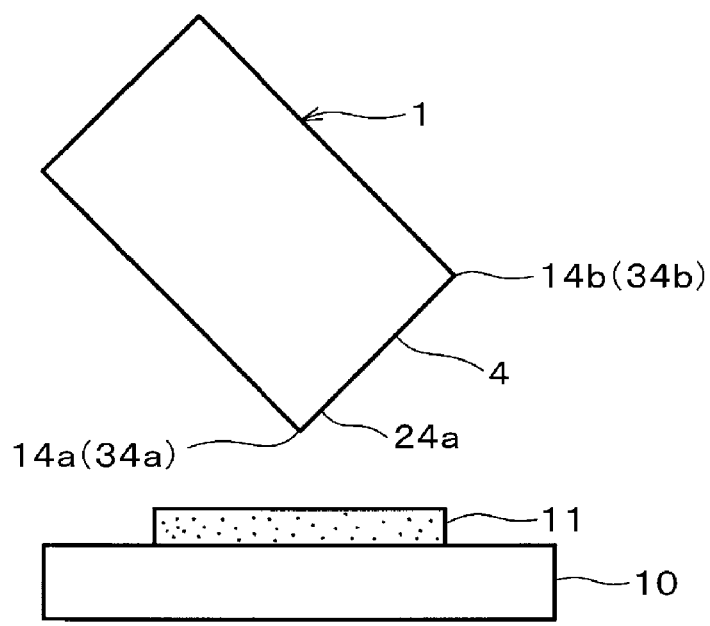

As shown in FIGS. 6A and 6B, the glass paste 11 was applied to the table 10 solidly without an interval.

Figure 7A:
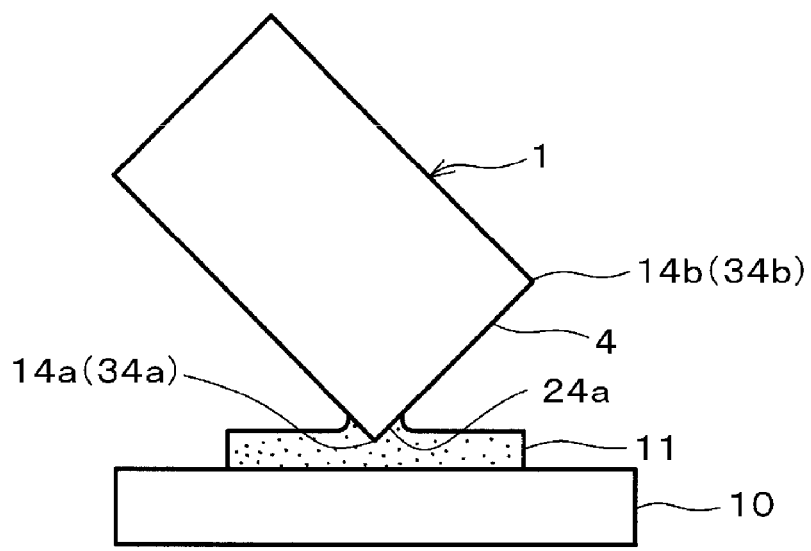
FIG. 7A and FIG. 7B are diagrams showing another example of the method for manufacturing the monolithic ceramic electronic component, and are diagrams showing the step following the step as shown in FIGS. 6A and 6B.
Figure 7B:
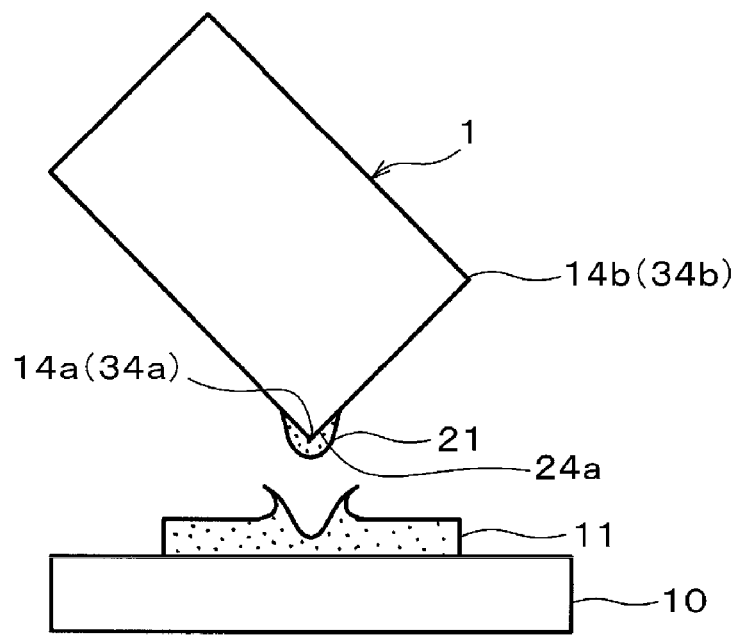

As shown in FIG. 7A, one end portion 34a of the end surface 4, at which the internal electrode layers 2 were exposed, was immersed into the glass paste 11, in a position in which the ceramic laminate 1 was inclined and one ridge 14a of two ridges 14a and 14b parallel to the lamination direction (the direction indicated by an arrow D as shown in FIG. 6A) in the end surface 4 was nearly parallel to the surface of the glass paste 11 applied to the table 10, and was pulled up, so as to adhere the glass paste 11 to one end portion side-region 24a (refer to FIG. 8 and FIG. 9) in the end surface 4 in such a way that one end portion A1 in the longitudinal direction of the exposed portion A of the internal electrode layer 2 was covered.

Likewise, although not specifically shown in the drawing, an end portion 34b opposed to the one end surface 34a of the end surface 4 was immersed into the glass paste 11, in a position in which the ceramic laminate 1 was inclined and the other ridge 14b of the two ridges 14 (14a, 14b) parallel or substantially parallel to the lamination direction (the direction indicated by the arrow D as shown in FIG. 6A) was nearly parallel to the surface of the glass paste 11 applied to the table 10, and was pulled up, so as to adhere the glass paste 11 to the other end portion-side region 24b in the end surface 4 such that the other end portion A2 in the longitudinal direction of the exposed portion A of the internal electrode layer 2 was covered.

Figure 8:
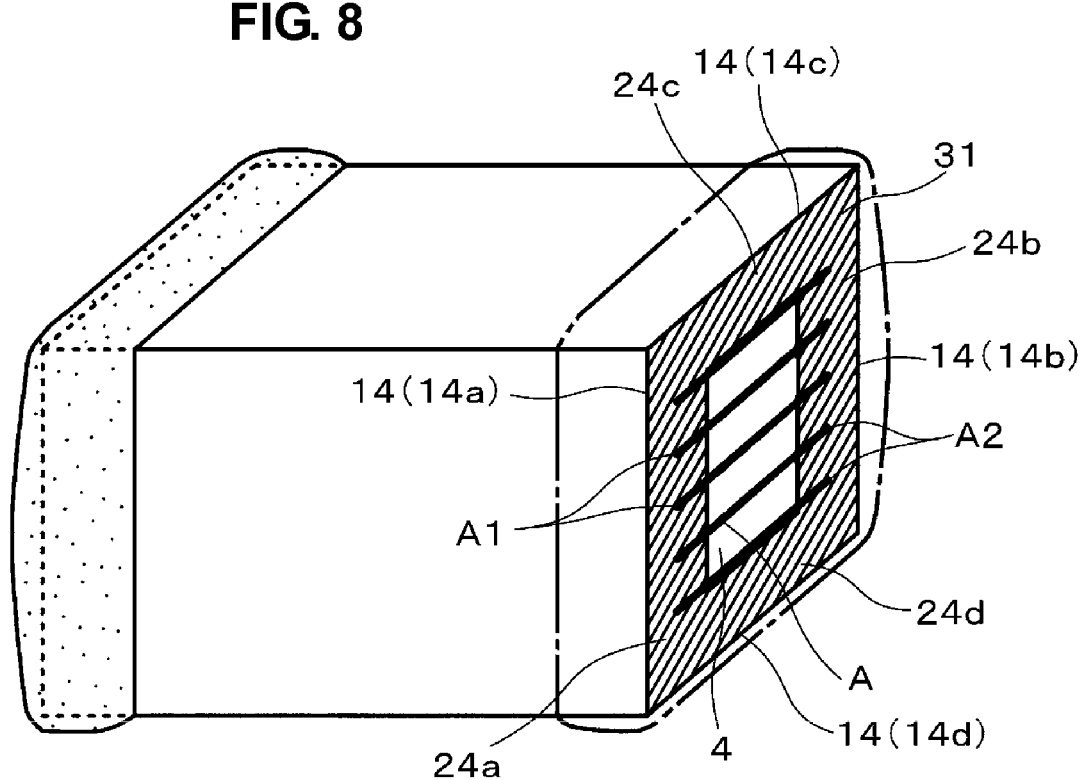
FIG. 8 is a perspective view showing another example of the monolithic ceramic electronic component (monolithic ceramic capacitor) according to a preferred embodiment of the present invention.
Figure 9:
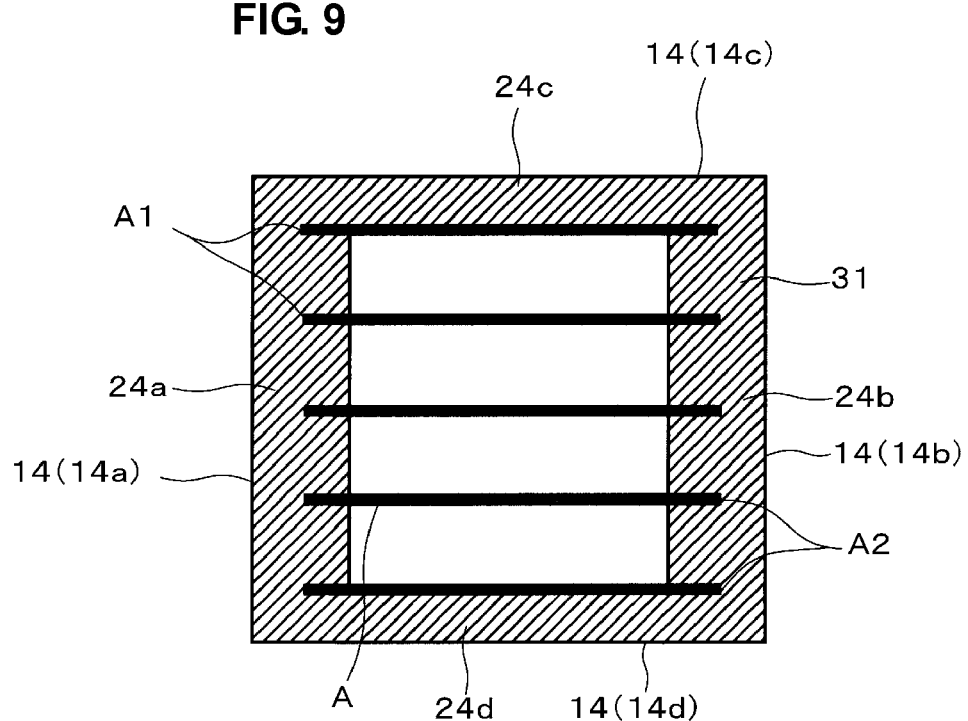
FIG. 9 is a diagram showing an end surface of a ceramic laminate of the monolithic ceramic electronic component as shown in FIG. 8.

The ceramic laminate 1 was further inclined, the upper end portion (the upper end portion as shown in FIG. 8 and FIG. 9) 34c (FIG. 6A) of the end surface 4, at which the internal electrode layers 2 were exposed, was immersed into the glass paste 11, in a position in which one ridge 14c of two ridges 14c and 14d included in the end surface 4 and perpendicular or substantially perpendicular to the lamination direction (the direction indicated by the arrow D as shown in FIG. 6A) was nearly parallel to the surface of the glass paste 11 applied to the table 10, and was pulled up, so as to adhere the glass paste 11 to the upper end-side region 24c (FIG. 8), at which the internal electrode layer was not exposed, from one ridge 14c that is perpendicular or substantially perpendicular to the lamination direction (the direction indicated by the arrow D as shown in FIG. 6A) to the region, at which the internal electrode layers 2 are exposed, on the end surface 4, at which the internal electrodes 2 were exposed, of the ceramic laminate 1.

The ceramic laminate 1 was further inclined, the lower end portion (the lower end portion as shown in FIG. 8 and FIG. 9) 34d (FIG. 6A) of the end surface 4, at which the internal electrode layers 2 were exposed, was immersed into the glass paste 11, in a position in which the other ridge 14d of the two ridges 14c and 14d included in the end surface 4 and perpendicular or substantially perpendicular to the lamination direction (the direction indicated by the arrow D as shown in FIG. 6A) was nearly parallel to the surface of the glass paste 11 applied to the table 10, and was pulled up, so as to adhere the glass paste 11 to the lower end-side region 24d (FIG. 8), at which the internal electrode layer was not exposed, from one ridge 14d that is perpendicular or substantially perpendicular to the lamination direction (the direction indicated by the arrow D as shown in FIG. 6A) to the region, at which the internal electrode layers 2 were exposed, on the end surface 4, at which the internal electrodes 2 were exposed, of the ceramic laminate 1.

In this manner, as shown in FIG. 8 and FIG. 9, the glass film 31 was applied into the shape of a substantially rectangular frame on the perimeter portion of the end surface 4, and the ceramic laminate 1 was produced, in which the end portion-side regions 24a and 24b including both end portions of the internal electrodes 2 exposed at the end surface 4 and the upper end-side region 24c and the lower end-side region 24d, at which the internal electrode layer 2 was not exposed, were covered with the glass paste 11.

In the present Example 1, the width of each of the upper end-side region 24c and the lower end-side region 24d, at which the internal electrode layer 2 was not exposed, (the thicknesses of the uppermost layer and the lowermost layer of the ceramic laminate 1) was about 0.2 mm on a value after firing basis. The glass paste 11 was applied in such a way as not to extend off this region having a width of about 0.2 mm, and the width of the glass film after firing was also about 0.2 mm.

The application region of the glass paste 11 in the end surface 4 can be adjusted by controlling the pulling-up rate of the ceramic laminate 1 after the ceramic laminate 1 is immersed in the glass paste 11.

The size of the application region of the glass paste 11 in the end surface 4 can also be adjusted by adjusting the depth of immersion of the ceramic laminate 1 or the inclination of the ceramic laminate 1 (angle of the end surface 4) in the immersion or by adjusting the viscosity of the glass paste 11.

(4) Production of External Electrode

The external electrode 5 (5a, 5b) was formed on the end surface 4 of the ceramic laminate 1, in which the glass paste film 21 was disposed on the end surface 4 as described above, in a manner and a condition similar to those for the Sample Nos. 1 to 4.

(5) Formation of Plating Film

The thus formed external electrode 5 (5a, 5b) was subjected to Ni plating and Sn plating in a manner and a condition similar to those for the Sample Nos. 1 to 4, so that a Ni plating film was formed on the external electrode 5 (5a, 5b) and, furthermore, a Sn plating film was formed on the Ni plating film.

In this manner, monolithic ceramic capacitors of Sample Nos. 5 to 8 were produced.

Production of Sample Nos. 9 to 11 (Comparative Examples)

For purposes of comparison, Sample No. 9 in which no glass film covering exposed portions of the internal electrode layers was formed on the end surface of a ceramic laminate, Sample No. 10 having a structure in which a pair of glass films were formed on the sides of one and the other ridges parallel or substantially parallel to the lamination direction, but both end sides of the exposed portions of the internal electrode layers were not covered with a glass film (that is, a sample having a large length of no glass film formation region in a direction along the longitudinal direction of the exposed portion of the internal electrode layer of about 1.0 mm), and Sample No. 11 in which the glass film was disposed on the entire end surface 4 of the ceramic laminate 1 were produced.

Evaluation

With respect to each Sample, the fraction defective (high temperature load fraction defective) in the high temperature load test was measured in order to examine the reliability of connection between the internal electrode layers and the external electrode and the reliability as a product.

With respect to the reliability of connection between the internal electrode layers and the external electrode, the capacitance was measured and an average value was determined. If there is a portion where the internal electrode layer and the external electrode is not connected, the value of the capacitance is decreased.

With respect to the high temperature load test for examining the reliability as a product, the IR deterioration rate after 100 Hr at 105° C. was determined. If deterioration of IR is recognized, the total judgment results in no good even when other characteristics are good.

The dimension of the glass film after the external electrode was formed through the firing step and the length S of the region not covered with the glass film on the end surface, at which the internal electrode layers were exposed, were values measured by dissolving the external electrode through electrolysis into an electrolytic solution and observing an exposed surface of the ceramic laminate and the glass film disposed therein with SEM.

The results thereof are shown in Table 1.

TABLE 1

| Sample No. | Glass film formation | Length S of no glass film formation region in length direction of exposed portion (mm) | Length of each glass film formation region at left and right ends in length direction of exposed portion (mm) | Length of each glass film formation region at upper and lower ends in direction orthogonal to length direction of exposed portion (mm) | Capacitance value (µF) | High temperature load fraction defective (%) | Total judgment |
|---|---|---|---|---|---|---|---|
| 1 | merely left and right ends (both end portions of exposed portion are covered) | 0.1 | 0.55 | — | 10.2 | 0 | ◯ |

TABLE 1-continued

| Sample No. | Glass film formation | Length S of no glass film formation region in length direction of exposed portion (mm) | Length of each glass film formation region at left and right ends in length direction of exposed portion (mm) | Length of each glass film formation region at upper and lower ends in direction orthogonal to length direction of exposed portion (mm) | Capacitance value (μF) | High temperature load fraction defective (%) | Total judgment |
|---|---|---|---|---|---|---|---|
| 2 | merely left and right ends (both end portions of exposed portion are covered) | 0.2 | 0.5 | — | 10.2 | 0 | ○ |
| 3 | merely left and right ends (both end portions of exposed portion are covered) | 0.4 | 0.4 | — | 10.2 | 0 | ○ |
| 4 | merely left and right ends (both end portions of exposed portion are covered) | 0.8 | 0.2 | — | 10.2 | 0 | ○ |
| 5 | left, right, upper, and lower ends (both end portions of exposed portion are covered) | 0.1 | 0.55 | 0.2 | 10.2 | 0 | ○ |
| 6 | left, right, upper, and lower ends (both end portions of exposed portion are covered) | 0.2 | 0.5 | 0.2 | 10.2 | 0 | ○ |
| 7 | left, right, upper, and lower ends (both end portions of exposed portion are covered) | 0.4 | 0.4 | 0.2 | 10.2 | 0 | ○ |
| 8 | left, right, upper, and lower ends (both end portions of exposed portion are covered) | 0.8 | 0.2 | 0.2 | 10.2 | 0 | ○ |
| 9 | no glass film | 1.2 | — | — | 10.2 | 100 | x |
| 10 | merely left and right ends (end portions of exposed portion are not covered) | 1.0 | 0.1 | — | 10.2 | 80 | x |
| 11 | glass film is formed on entire end surface | 0 | 1.2 (entire surface) | 1.2 (entire surface) | 0.2 | not evaluated | x |

\* size of monolithic ceramic electronic component 2.0 mm × 1.2 mm × 1.2 mm
\* exposed portion: exposed portion of internal electrode layer As is ascertained from Table 1, with respect to Sample Nos. 1 to 8 satisfying the requirements of various preferred embodiments of the present invention, highly reliable products (monolithic ceramic capacitor) were able to be produced, wherein the reliability of electrical connection between the internal electrodes and the external electrode was high, any high temperature load defective did not occur, and satisfactory characteristics were exhibited.

On the other hand, with respect to Sample 9 in which no glass film was included, the high temperature load fraction defective was a high 100% and, therefore, it was ascertained that the practicality was poor.

With respect to Sample No. 10 having a structure in which a pair of glass films were formed on the sides of one and the other ridges parallel to the lamination direction, but both end sides of the exposed portions of the internal electrode layers were not covered with a glass film, the high temperature load fraction defective was a high 80% and, therefore, it was also ascertained that the practicality was poor.

With respect to Sample No. 11 in which the glass film was disposed on the entire end surface of the ceramic laminate, the connection between the external electrode and the internal electrode layers was hardly ensured, as a matter of course. With respect to Sample No. 11, the high temperature load fraction defective was not evaluated.

EXAMPLE 2

Figure 10:
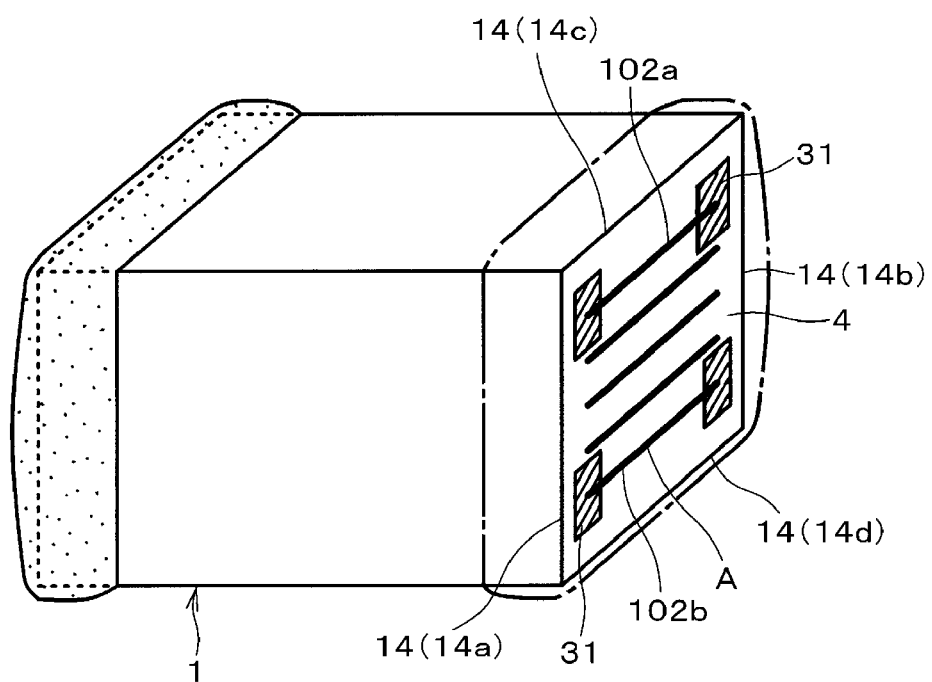
FIG. 10 is a perspective view showing the configuration of a monolithic ceramic electronic component (monolithic ceramic capacitor) according to another example (Example 2) of preferred embodiments of the present invention.
Figure 11:
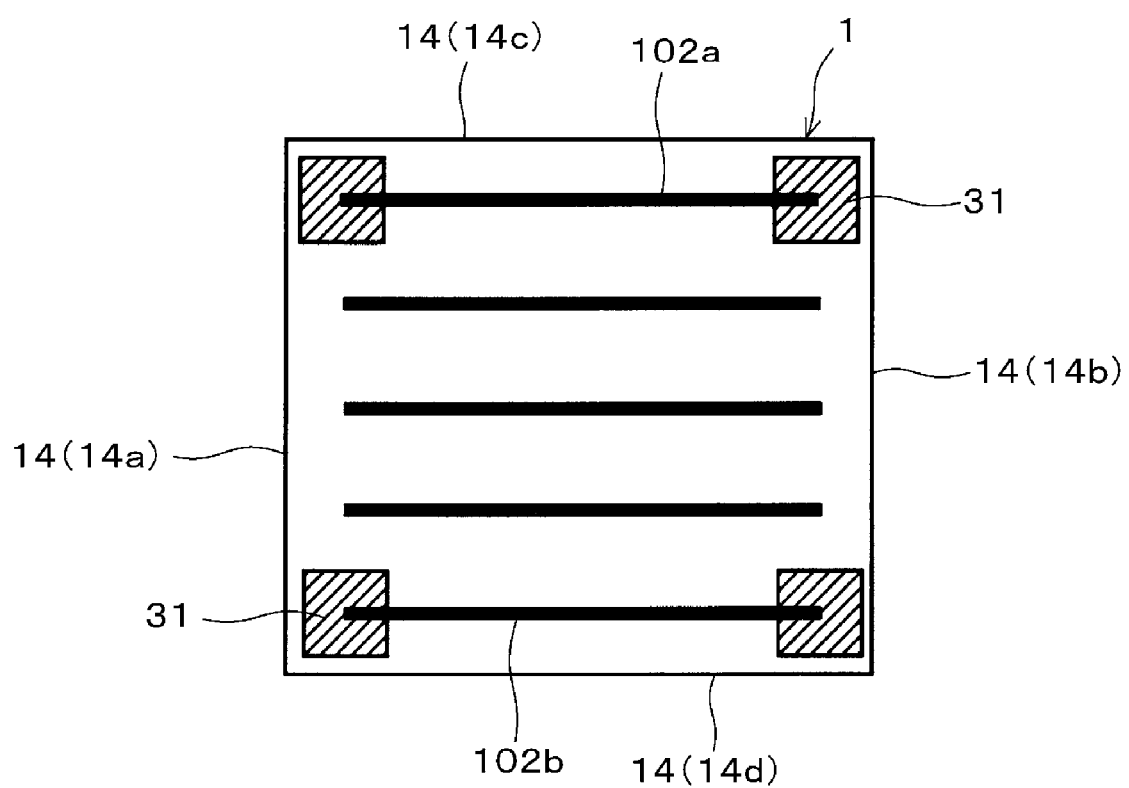
FIG. 11 is a diagram showing an end surface of a ceramic laminate of the monolithic ceramic electronic component as shown in FIG. 10.

FIG. 10 and FIG. 11 are diagrams showing key portions of a monolithic ceramic electronic component (monolithic ceramic capacitor) according to another example (Example 2) of preferred embodiments of the present invention.

As shown in FIG. 10 and FIG. 11, in the monolithic ceramic electronic component of Example 2, among a plurality of internal electrode layers 2 exposed at an end surface 4 of a ceramic laminate 1, only both end portions in a longitudinal direction of the exposed portions of the uppermost internal electrode layer 102a and the lowermost internal electrode layer 102b are covered with glass films 31, and the other portions are not specifically covered with the glass film.

With respect to the configuration of Example 2 in which only both end portions in the longitudinal direction of the exposed portions of the uppermost internal electrode layer 102a and the lowermost internal electrode layer 102b are covered with glass films 31, as described above, since the vicinities of four corners, at which the thickness of the external electrode is easily the most to decrease, of the end surface 4 are covered with the glass films 31 and both end portions of the exposed portions of the uppermost internal electrode layer 102a and the lowermost internal electrode layer 102b are sealed with glass films 31, intrusion of the plating solution into the ceramic laminate 1 during the plating step can be suppressed efficiently.

Figure 12A:
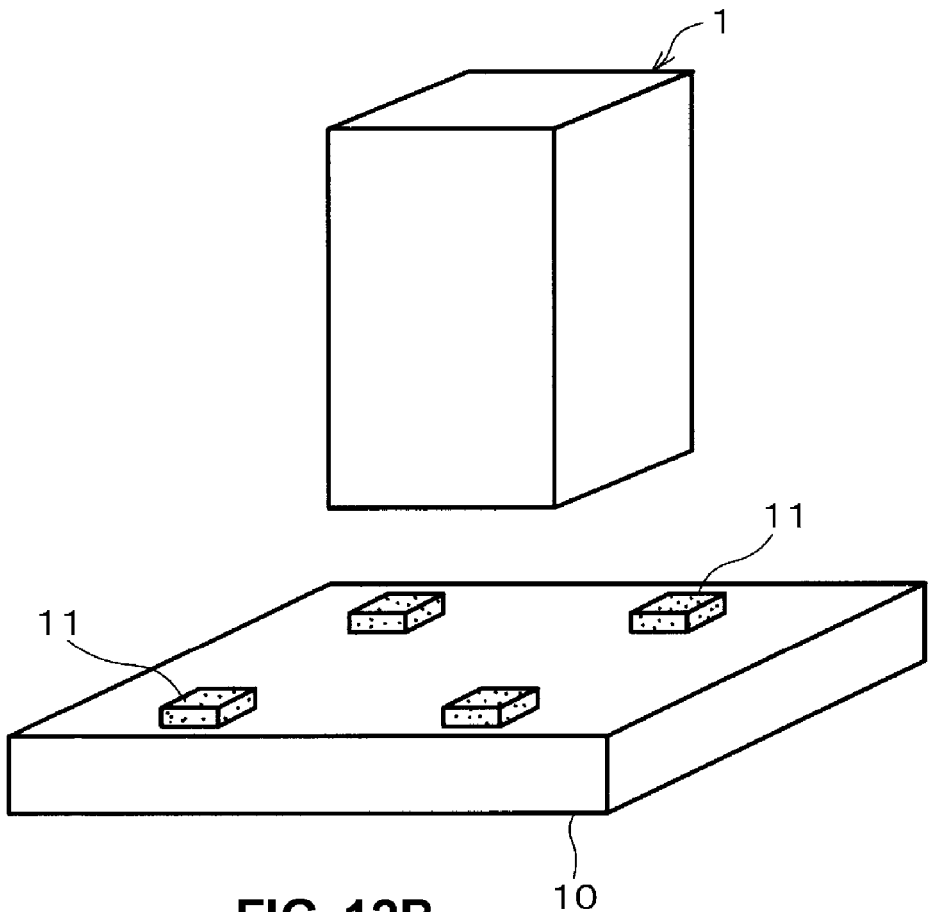
FIG. 12A is a perspective view and FIG. 12B is an elevation view showing a method for manufacturing the monolithic ceramic electronic component as shown in FIG. 10 and FIG. 11.
Figure 12B:
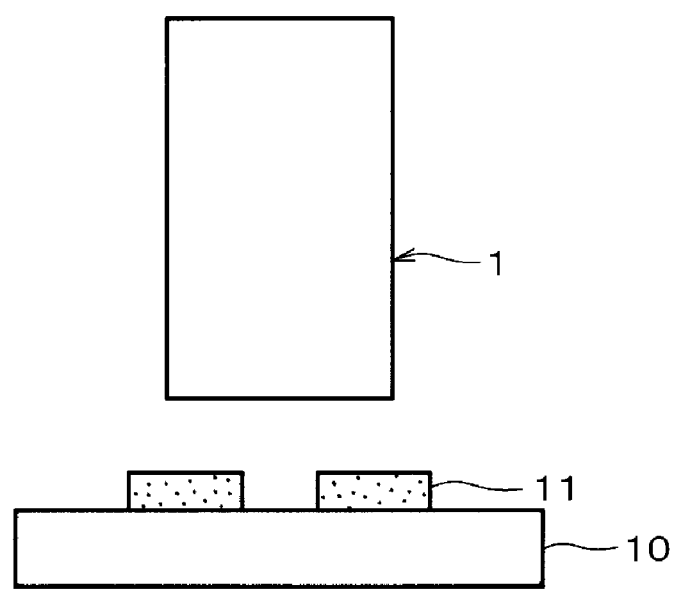

This monolithic ceramic electronic component of Example 2 can be produced in a procedure similar to that used for Samples 1 to 4 in the Example 1 after applying the four-divided glass paste 11 to the table 10 as shown in FIGS. 12A and 12B, immersing the ceramic laminate 1 therein so as to adhere the glass paste to the vicinities of four corners of the end surface 4, and drying.

Figure 13:
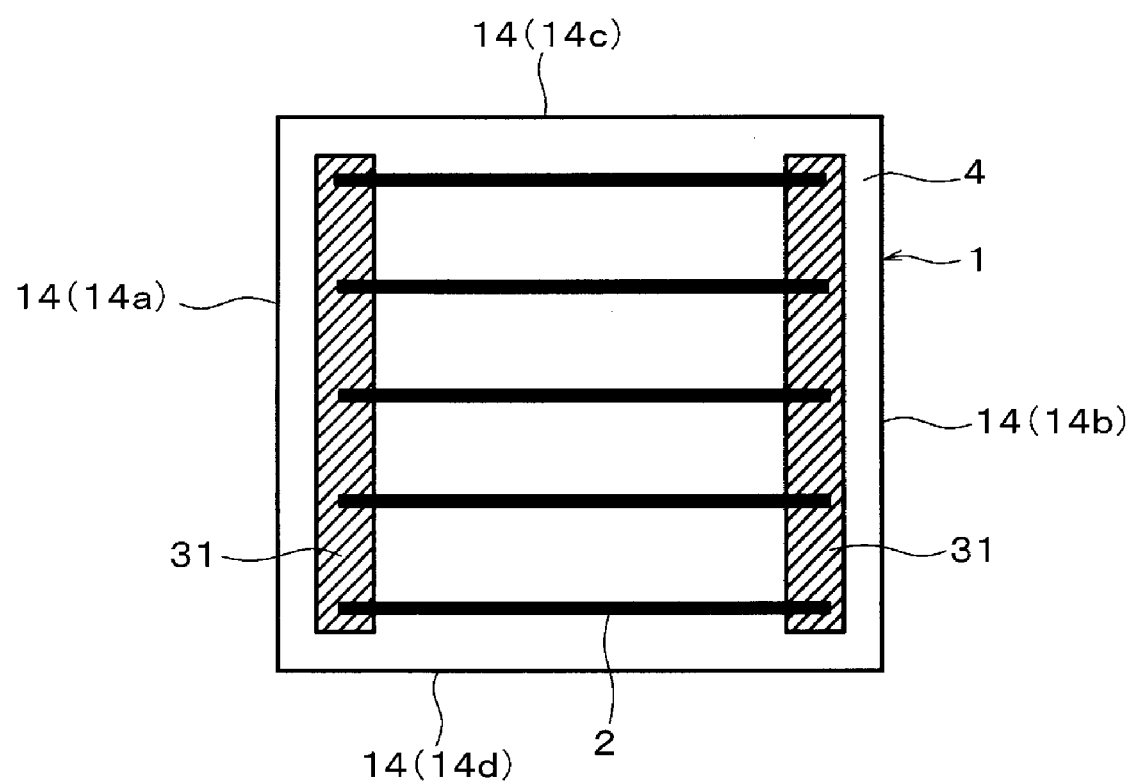
FIG. 13 is a diagram showing an end surface of a ceramic laminate according to another preferred embodiment of the present invention.

FIG. 13 shows a modified example of the form in which the end surface 4 of the ceramic laminate 1 is covered with the glass film 31.

That is, in FIG. 13, both end portions in the longitudinal direction of the exposed portion of each of the plurality of internal electrode layers 2 are covered with the glass film 31. This point is the same as those of Sample Nos. 1 to 4 in the Example 1, but the glass film 31 is disposed not to reach each ridge 14 of the end surface 4. In the case where the glass film 31 is disposed in such a manner as well, since both end portions in the longitudinal direction of the exposed portion can be covered with the glass film 31 reliably, intrusion of the plating solution into the ceramic laminate 1 during the plating step can be suppressed.

In the monolithic ceramic electronic component of the present invention, a specific pattern of the glass film is not particularly limited. For example, as shown in FIG. 14A, the end portion of the glass film 31 may be in a wave shape.

Figure 14A:
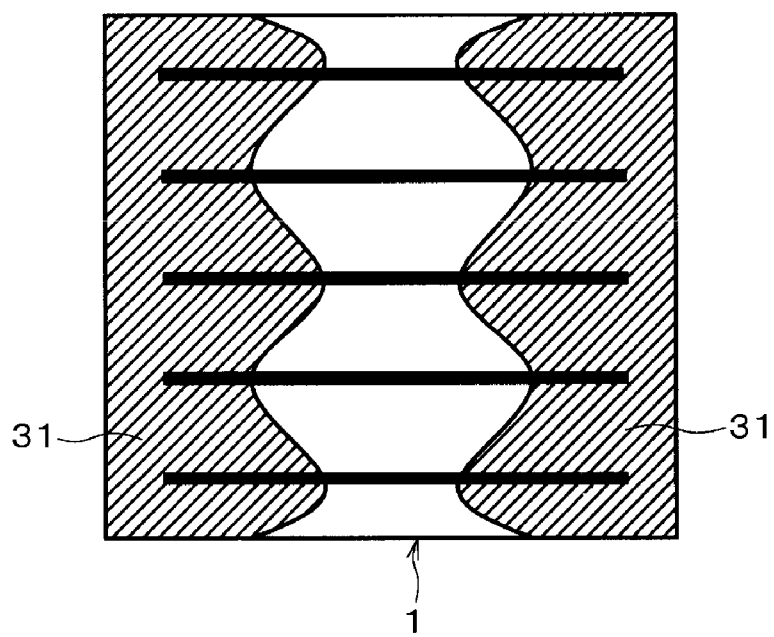
FIG. 14A and FIG. 14B are diagrams, each showing an end surface of a ceramic laminate according to another preferred embodiment of the present invention.
Figure 14B:
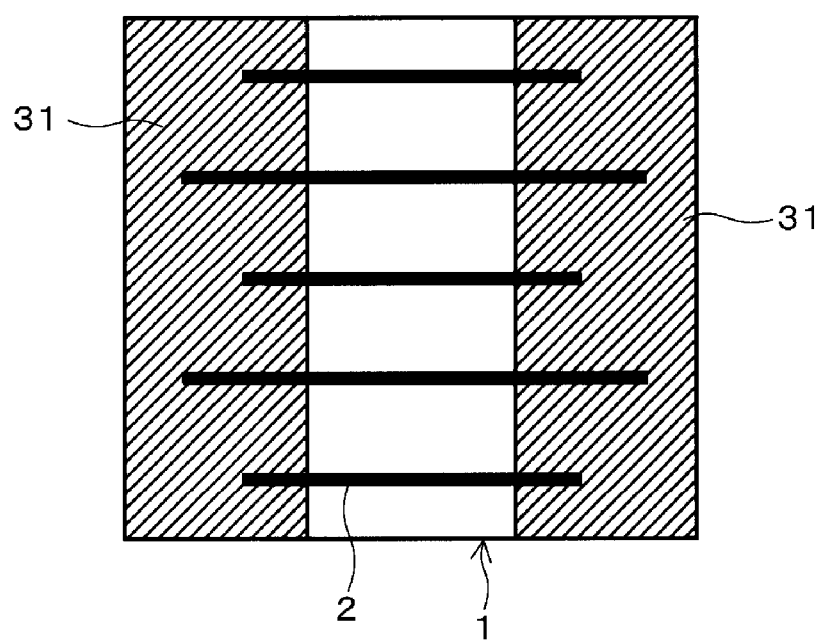
Figure 15:
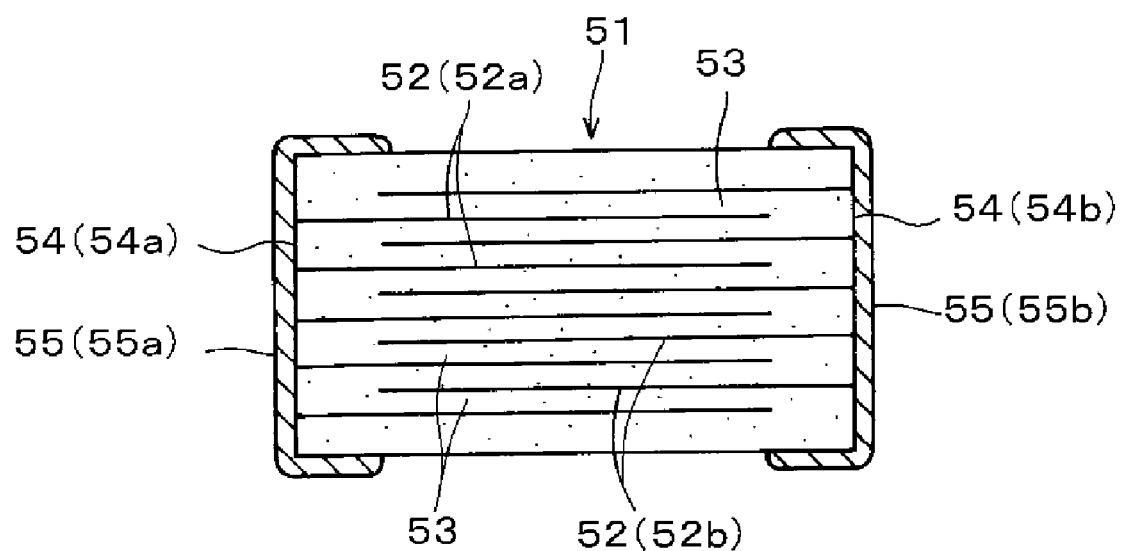
FIG. 15 is a sectional view showing the configuration of a known monolithic ceramic electronic component (monolithic ceramic capacitor).
Figure 16A:
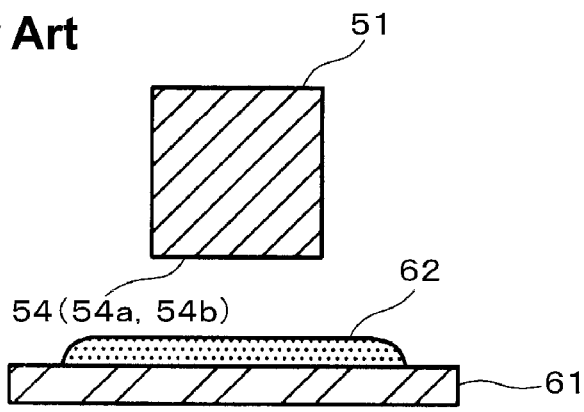
FIG. 16A through FIG. 16C are diagrams showing a method for manufacturing a known monolithic ceramic electronic component.
Figure 16B:
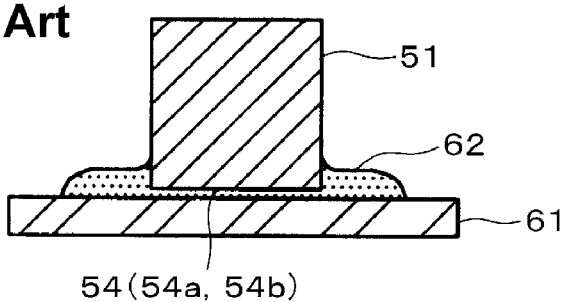
Figure 16C:
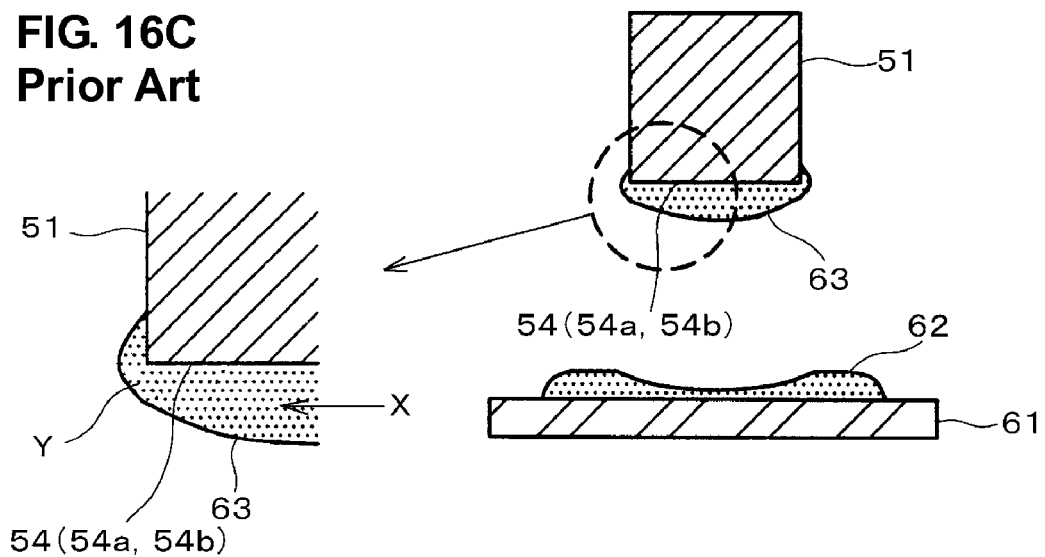
Figure 17A:
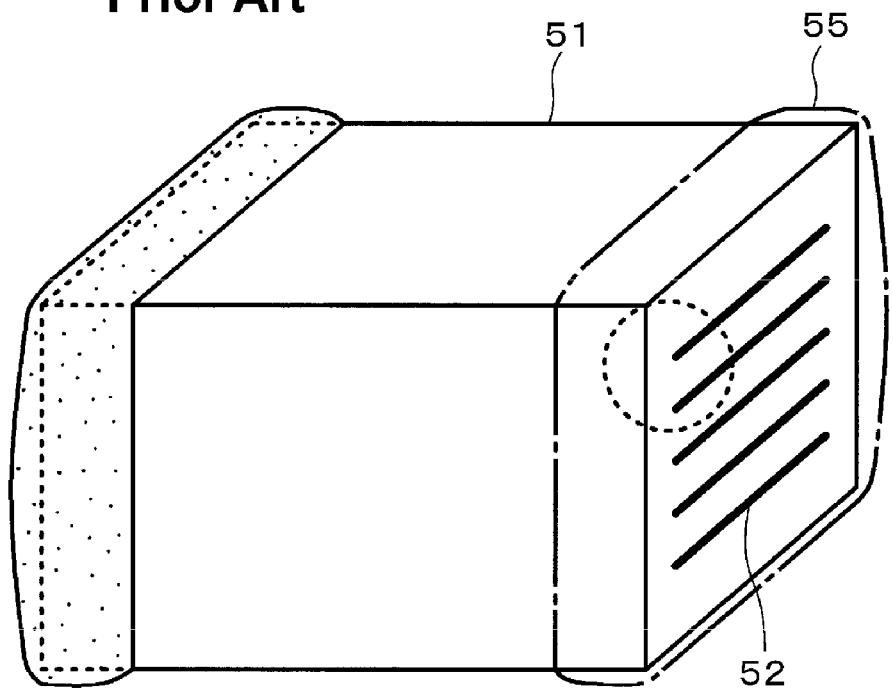
FIG. 17A and FIG. 17B are diagrams for explaining problems of a known monolithic ceramic electronic component.
Figure 17B:
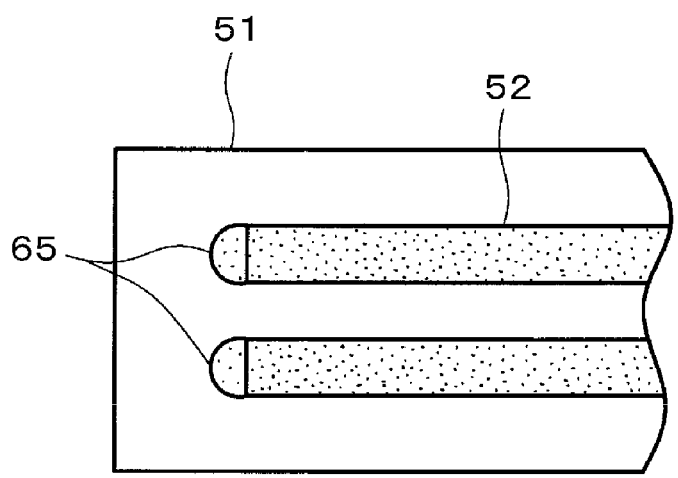

Furthermore, the present invention can also be applied to the case where the lengths of the exposed portions of the internal electrode layers 2 are different, as shown in FIG. 14B.

In both cases shown in the FIGS. 14A and 14B, since both end portions of exposed portions of the internal electrode layers 2 are covered with the glass films 31, intrusion of the plating solution into the ceramic laminate 1 during the plating step can be suppressed.

The present invention is not limited to the above-described examples, and various applications and modifications can be conducted within the scope of the invention with respect to the type of ceramic constituting the ceramic layer, the type of metal material constituting the internal electrode layer and the external electrode, the type of glass constituting the glass film, the form of disposition of the internal electrode layer and the baked external electrode, the specific structure of the ceramic laminate, and the like.

As described above, in the monolithic ceramic electronic component according to various preferred embodiments of the present invention, regions, into which the plating solution or the like is liable to intrude, in the end surface of the ceramic laminate is sealed by being covered with the glass film, whereas in the other portions, the internal electrode layers are exposed at the end surface in order to ensure the electrical connection to the external electrode. Therefore, a highly reliable monolithic ceramic electronic component exhibiting excellent weather resistance and the like can be provided.

Consequently, the present invention can be widely applied to monolithic ceramic electronic components, e.g., monolithic ceramic capacitors, monolithic LC composite components, and multilayer substrates, having a structure in which an external electrode is disposed on an end surface of a ceramic laminate, at which internal electrode layers are exposed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A monolithic ceramic electronic component comprising:
a ceramic laminate including:
    a plurality of ceramic layers; and
    an internal electrode layer disposed between the ceramic layers such that a portion of the internal electrode layer is led to an end surface of the ceramic laminate; and an external electrode disposed on the end surface of the ceramic laminate, to which the internal electrode layer is led, so as to connect to the internal electrode layer; wherein at least one end portion in a longitudinal direction of an exposed portion, at which the internal electrode layer is led and exposed, in the end surface of the ceramic laminate is covered with a glass film; and the internal electrode layer and the external electrode are electrically connected to each other at a portion not covered with the glass film in the exposed portion of the internal electrode layer.

2. The monolithic ceramic electronic component according to claim 1, wherein on the end surface of the ceramic laminate, at which the internal electrodes are exposed, the glass film covering both end portions in the longitudinal direction of the exposed portion of the internal electrode layer is disposed to extend from one ridge substantially perpendicular to the lamination direction among ridges included in the end surface so as to reach another ridge opposite to the one ridge and is also disposed to extend from the ridge parallel to the lamination direction to a position suitable for covering both end portions in the longitudinal direction of the exposed portion of the internal electrode layer, and the internal electrode layers and the external electrode are electrically connected to each other at portions not covered with the glass film in center portions in the longitudinal direction of the internal electrode layers.

3. The monolithic ceramic electronic component according to claim 1, wherein in that in the exposed portion of the internal electrode layer on the end portion of the ceramic laminate, the length in a direction along the longitudinal direction of the internal electrode layer of a portion not covered with the glass film covering both end portions in the longitudinal direction is about 0.1 mm or more.

4. The monolithic ceramic electronic component according to claim 1, wherein on the end surface of the ceramic laminate, at which the internal electrode layers are exposed, at least one region of two regions, at which the internal electrode layer is not exposed, from one ridge and the other ridge substantially perpendicular to the lamination direction to the region, at which the internal electrode layers are exposed, is covered with the glass film.

5. A monolithic ceramic electronic component comprising:
a ceramic laminate including:
    a plurality of ceramic layers; and
    a plurality of internal electrode layers disposed between the plurality of ceramic layers such that a portion of each internal electrode layer is led to an end surface of the ceramic laminate; and an external electrode disposed on the end surface of the ceramic laminate, to which the plurality of internal electrode layers are led, so as to connect to the plurality of internal electrode layers; wherein at least one end portion in a longitudinal direction of at least one of the uppermost internal electrode layer and the lowermost internal electrode layer among the plurality of internal electrode layers led to and exposed at the end surface of the ceramic laminate is covered with a glass film; and the plurality of internal electrode layers and the external electrode are electrically connected to each other at portions not covered with the glass film among the exposed portions of the plurality of internal electrode layers.

6. The monolithic ceramic electronic component according to claim 5, wherein both end portions in the longitudinal direction of both the uppermost internal electrode layer and the lowermost internal electrode layer are covered with the glass film.

7. The monolithic ceramic electronic component according to claim 5, wherein at least both end portions in a longitudinal direction of all the plurality of internal electrode layers exposed at the end surface of the ceramic laminate are covered with the glass film.

8. The monolithic ceramic electronic component according to claim 5, wherein on the end surface of the ceramic laminate, at which the internal electrodes are exposed, the glass film covering both end portions in the longitudinal direction of the exposed portion of the internal electrode layer is disposed to extend from one ridge substantially perpendicular to the lamination direction among ridges included in the end surface of the ceramic laminate so as to reach another ridge opposite to the one ridge and is also disposed to extend from the ridge parallel to the lamination direction to a position suitable for covering both end portions in the longitudinal direction of the exposed portion of the internal electrode layer, and the internal electrode layers and the external electrode are electrically connected to each other at portions not covered with the glass film in center portions in the longitudinal direction of the internal electrode layers.

9. The monolithic ceramic electronic component according to claim 5, wherein in that in the exposed portion of the internal electrode layer on the end portion of the ceramic laminate, the length in a direction along the longitudinal direction of the internal electrode layer of a portion not covered with the glass film covering both end portions in the longitudinal direction is about 0.1 mm or more.

10. The monolithic ceramic electronic component according to claim 5, wherein on the end surface of the ceramic laminate, at which the internal electrode layers are exposed, at least one region of two regions, at which the internal electrode layer is not exposed, from one ridge and the other ridge substantially perpendicular to the lamination direction to the region, at which the internal electrode layers are exposed, is covered with the glass film.

11. A method for manufacturing a monolithic ceramic electronic component including a ceramic laminate, in which internal electrode layers are disposed between ceramic layers such that a portion of each internal electrode is led to an end surface of the ceramic substrate, and an external electrode disposed on the end surface of the ceramic laminate, to which the internal electrode layers are led, so as to connect to the internal electrode layers and having a structure in which at least one end portion in a longitudinal direction of an exposed portion of the internal electrode layer exposed at the end surface of the ceramic laminate is covered with a glass film, the method comprising the steps of:

(a) forming the ceramic laminate including the internal electrode layers disposed between the ceramic layers such that a portion of each internal electrode is led to an end surface of the ceramic substrate;

(b) applying a glass paste to a support;

(c) immersing the end surface of the ceramic laminate, at which the internal electrode layers are led and exposed, into the glass paste on the support such that the glass paste is adhered to at least one end portion in a longitudinal direction of the exposed portion of the internal electrode layer;

(d) applying an electrically conductive paste for forming an external electrode to the end surface of the ceramic laminate, in which the glass paste is adhered to at least one end portion of the ceramic laminate in the longitudinal direction of the exposed portion of the internal electrode layer; and (e) heat-treating the ceramic laminate to bake the glass paste and the electrically conductive paste so as to fire the glass film and the external electrode.

12. The method for manufacturing a monolithic ceramic electronic component according to claim 11, wherein in the step (b), the glass paste is applied at a predetermined interval to the support, and in the step (c), the end surface of the ceramic substrate, at which the internal electrode layers are led and exposed, is immersed into the glass paste on the support such that the glass paste is adhered to both end portions in the longitudinal direction of the exposed portion of the internal electrode layer.

13. A method for manufacturing a monolithic ceramic electronic component including a ceramic laminate, in which internal electrode layers are disposed between ceramic layers such that a portion of each internal electrode is led to an end surface of the ceramic laminate, and an external electrode disposed on the end surface, to which the internal electrode layers are led, so as to connect to the internal electrode layers and having a structure in which at least one end portion in a longitudinal direction of an exposed portion of the internal electrode layer exposed at the end surface of the ceramic laminate is covered with a glass film, the method comprising the steps of:

(a) forming the ceramic laminate including the internal electrode layers disposed between the ceramic layers such that a portion of each internal electrode is led to an end surface of the ceramic laminate;

(b) applying a glass paste to a support;

(c) immersing one end portion of the end surface of the ceramic laminate, at which the internal electrode layers are exposed, into the glass paste, in a position in which the ceramic laminate is inclined and a ridge substantially parallel to the lamination direction, among ridges included in the end surface of the ceramic laminate, is nearly parallel to the surface of the glass paste applied to the support, so as to adhere the glass paste to at least the one end portion in the longitudinal direction of the exposed portion of the internal electrode layer, in a glass paste application step;

(d) applying an electrically conductive paste for forming an external electrode to the end surface of the ceramic laminate, in which the glass paste is adhered to at least the one end portion in the longitudinal direction of the exposed portion of the internal electrode layer, of the ceramic laminate; and (e) heat-treating the ceramic laminate to bake the glass paste and the electrically conductive paste so as to fire the glass film and the external electrode.

14. The method for manufacturing a monolithic ceramic electronic component according to claim 13, wherein in the step (c) of applying the glass paste, after the glass paste is adhered to at least the one end portion in the longitudinal direction of the exposed portion of the internal electrode layer, the ceramic laminate is further inclined, the end portion of the end surface of the ceramic laminate, at which the internal electrode layers are exposed, is immersed into the glass paste in a position in which a ridge that is substantially perpendicular to the lamination direction among the ridges included in the end surface of the ceramic laminate, is nearly parallel to the surface of the glass paste applied to the support, so as to adhere the glass paste to at least one region of two regions, at which the internal electrode layer is not exposed, from one ridge and the other ridge that is substantially perpendicular to the lamination direction to the region, at which the internal electrode layers are exposed, on the end surface of the ceramic laminate, at which the internal electrodes are exposed.

* * * * *